(12) United States Patent  
Takusagawa et al.

(10) Patent No.: US 7,698,436 B2  
(45) Date of Patent: Apr. 13, 2010

(54) IP CONNECTION PROCESSING DEVICE

(75) Inventors: Hideaki Takusagawa, Kawasaki (JP); Keiichi Nakatsugawa, Kawasaki (JP); Yuji Matsumoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1567 days.

(21) Appl. No.: 10/746,915

(22) Filed: Dec. 24, 2003

(65) Prior Publication Data

US 2004/0158639 A1    Aug. 12, 2004

(30) Foreign Application Priority Data

Dec. 27, 2002   (JP)   ............... 2002-381929  
Jul. 22, 2003    (JP)   ............... 2003-199887

(51) Int. Cl.  
   *G06F 15/16*   (2006.01)

(52) U.S. Cl. ............... 709/227; 709/228; 709/229

(58) Field of Classification Search .......... 709/227–229  
See application file for complete search history.

(56) References Cited

U.S. PATENT DOCUMENTS

| | | | | |
|---|---|---|---|---|
| 6,151,628 | A * | 11/2000 | Xu et al. ............ | 709/225 |
| 6,307,837 | B1 * | 10/2001 | Ichikawa et al. ...... | 370/230 |
| 6,922,728 | B2 * | 7/2005 | Cho ............... | 709/227 |
| 7,298,751 | B1 * | 11/2007 | Baker et al. .......... | 370/401 |
| 2005/0286489 | A1 * | 12/2005 | Shin et al. ........... | 370/352 |
| 2008/0081592 | A1 * | 4/2008 | Das et al. ............ | 455/406 |
| 2008/0141296 | A1 * | 6/2008 | Yoon ............... | 725/31 |
| 2008/0151847 | A1 * | 6/2008 | Abujbara ........... | 370/338 |
| 2008/0194229 | A1 * | 8/2008 | Pan ............... | 455/406 |
| 2009/0037734 | A1 * | 2/2009 | Kito ............... | 713/168 |

FOREIGN PATENT DOCUMENTS

| | | |
|---|---|---|
| JP | 2001-345802 | 12/2001 |
| WO | 02/15472 | 2/2002 |

OTHER PUBLICATIONS

Notice of Reasons for Rejection mailed May 27, 2008, from the corresponding Japanese Application.  
Notice of Reasons for Rejection mailed Feb. 10, 2009, from the corresponding Japanese Application.  
T. Narten, et al. "Neighbor Discovery for IP Version 6 (IPv6)" Network Working Group, Aug. 1996, retrieved from http://tools.ietf.org/html/rfc1970. See particularly "6.3.7 Sending Router Solicitations".

* cited by examiner

*Primary Examiner*—Nathan Flynn  
*Assistant Examiner*—Mohamed Wasel  
(74) *Attorney, Agent, or Firm*—Katten Muchin Rosenman LLP

(57) ABSTRACT

An IP connection processing device and, more particularly, an IP connection processing device that, upon completion of user authentication, initiates a connection to an IP network in a designated area constructed by a wireless LAN or the like. The IP connection processing device, which processes the connection to the IP network that requires user authentication for connection to the network, includes components for: detecting authentication completion; acquiring an authentication result; and initiating or resuming the IP connection processing upon detection of the authentication completion. The IP connection processing device, upon detection of the authentication completion, requests IP address information from the IP network, and acquires an IP address of its own based on the information returned by the IP network.

17 Claims, 37 Drawing Sheets

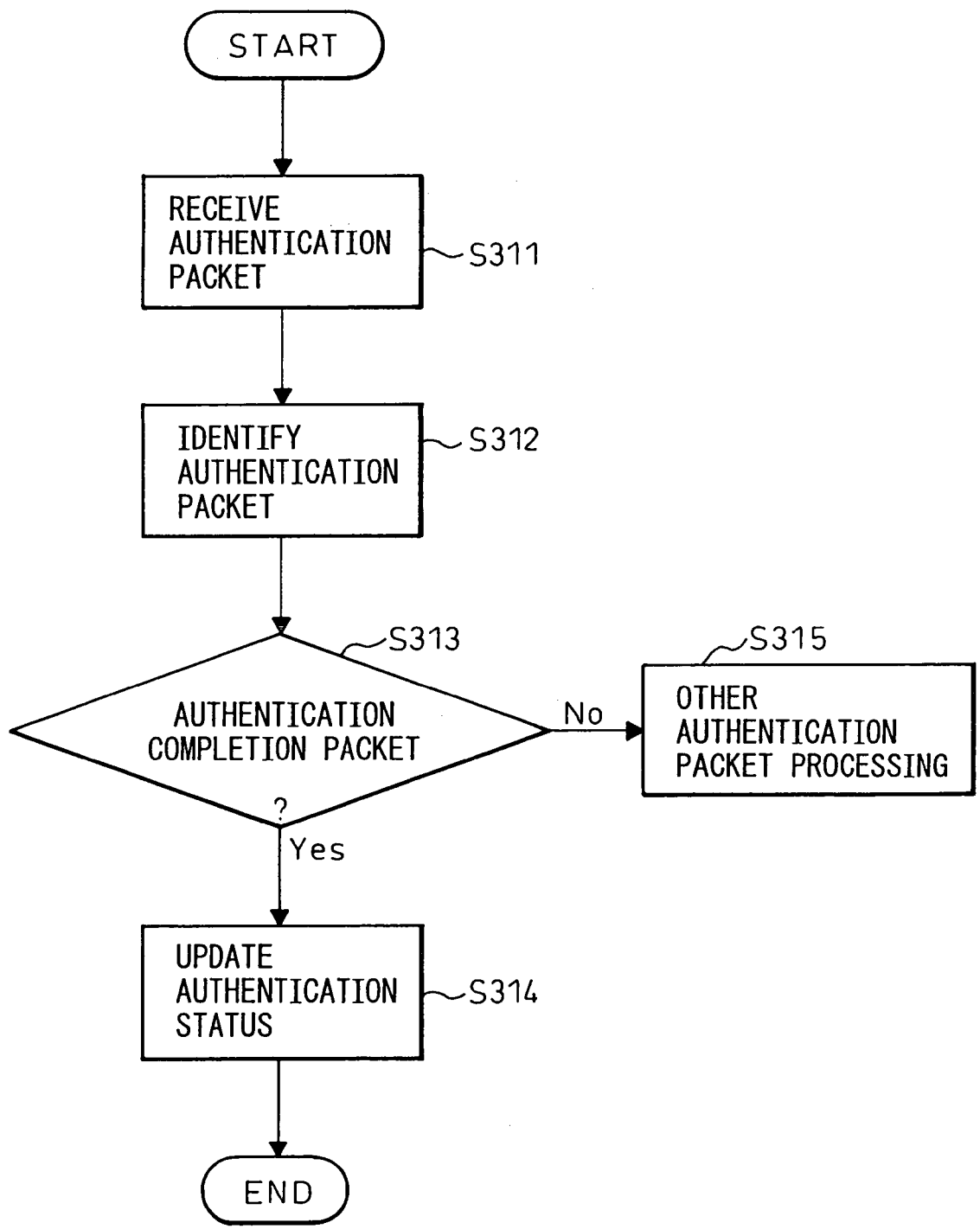

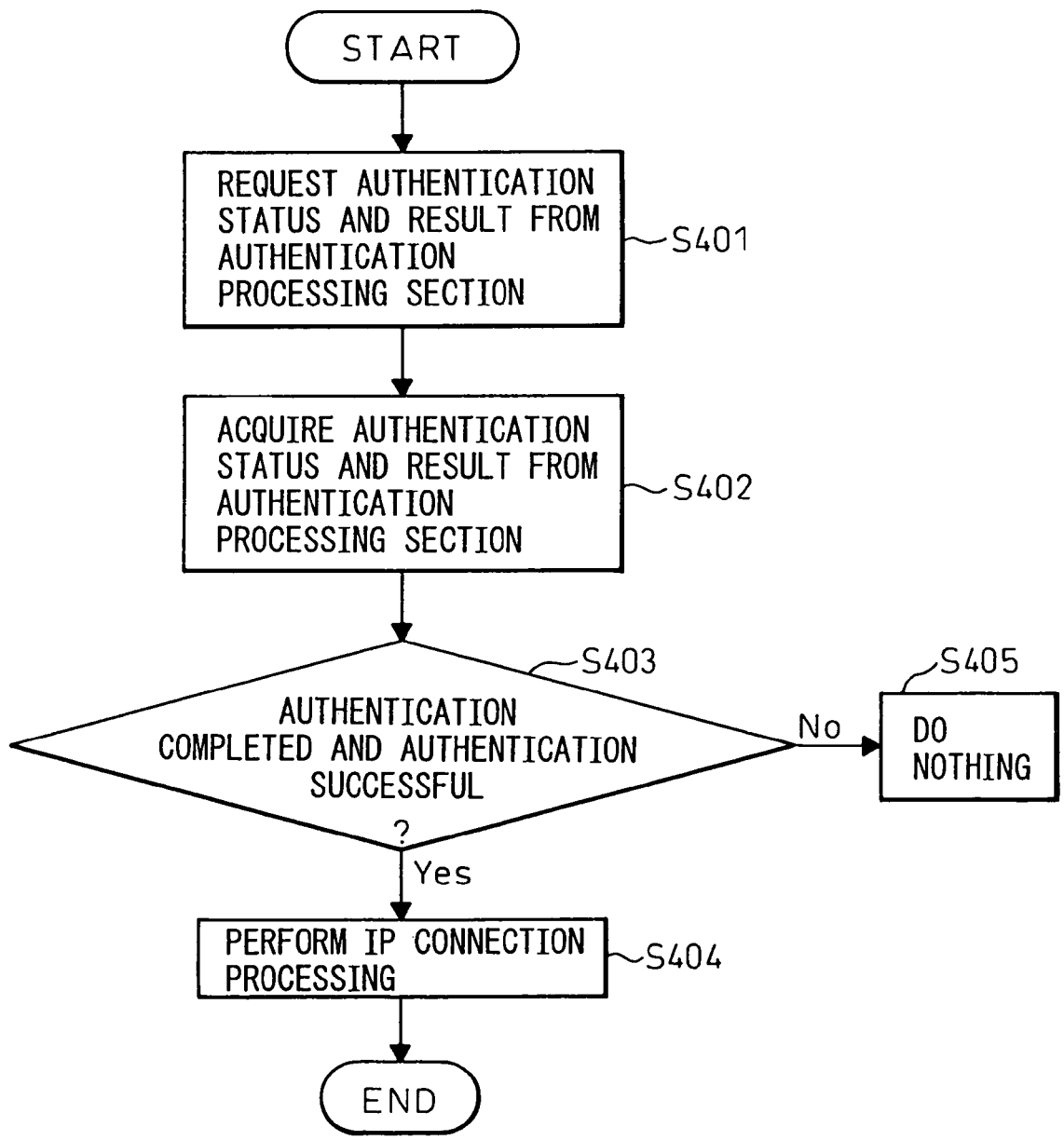

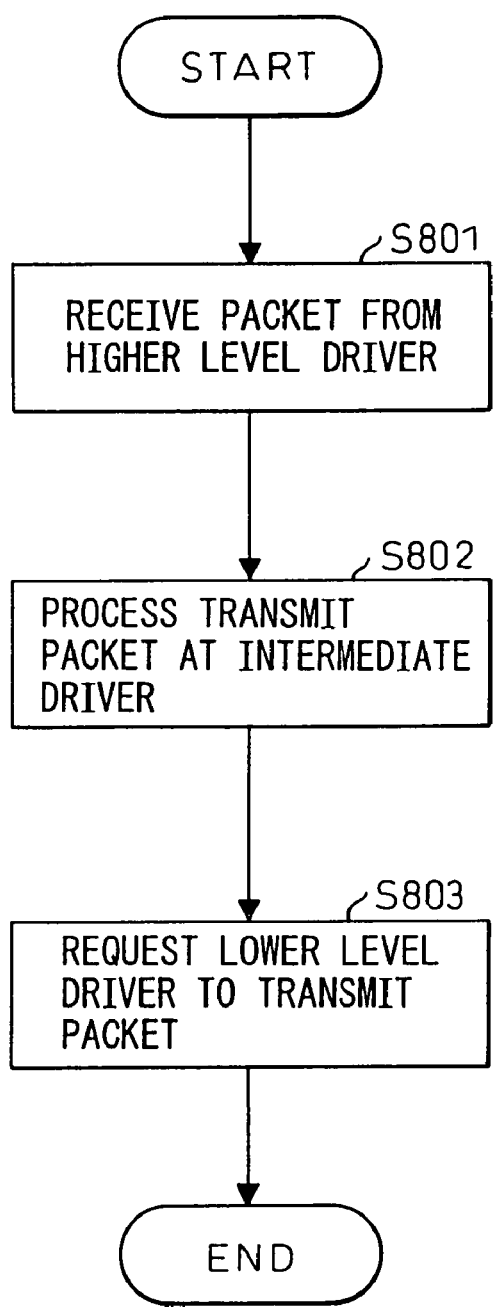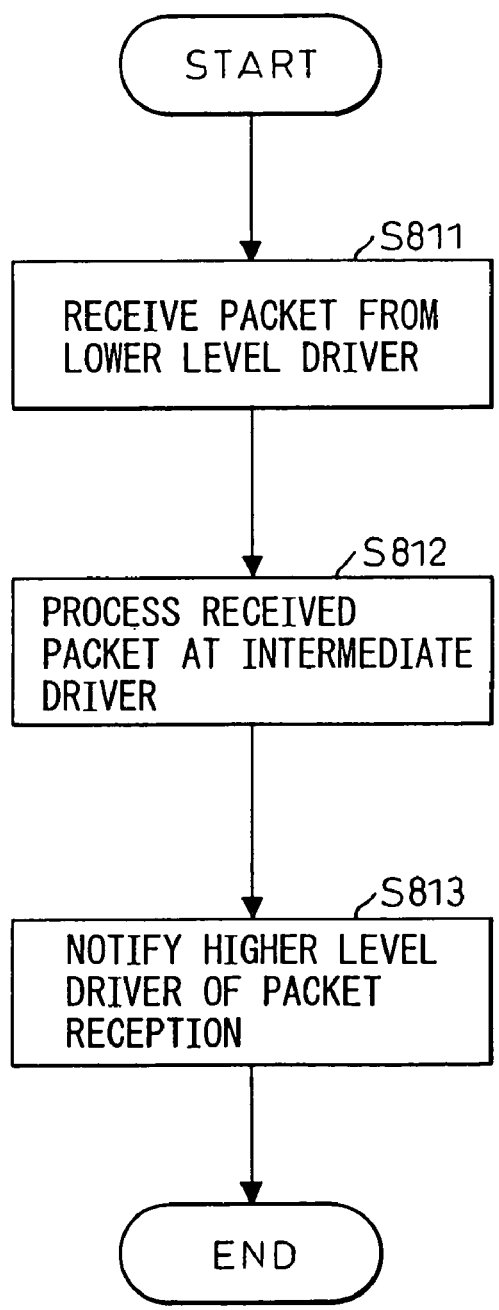

FIG.32

| ACCESS RESTRICTION (ENABLE/DISABLE) | | | |
|---|---|---|---|
| ACCESS RESTRICTION ENFORCED (ENABLE/DISABLE) | | | |
| RESTRICTION TARGET AP | FLAG | NUMBER OF FAILURES | RESTRICTION THRESHOLD | RESTRICTION TIME |
| ~ | | | |
| RESTRICTION TARGET AP(n) | FLAG | NUMBER OF FAILURES | RESTRICTION THRESHOLD | RESTRICTION TIME |

54

IP CONNECTION PROCESSING DEVICE

BACKGROUND OF THE INVENTION

1. Field of the Invention

The present invention relates to an IP connection processing device and, more particularly, to an IP connection processing device that, upon completion of user authentication, initiates a connection to an IP network in a designated area constructed by a wireless LAN or the like.

2. Description of the Related Art

Wireless LAN is one of the technologies that have been attracting attention, in recent years, due to the explosive proliferation of the Internet. Originally, the wireless LAN was developed as a technology for constructing a LAN environment in offices by using wireless connections. In recent years, however, a wireless LAN service called the "hot spot service" has been spreading which offers customers high-speed Internet access from public spaces such as railway stations and coffee shops by installing wireless LANs in such locations.

The packet communication speed of the wireless LAN is 11 Mbps based on the IEEE 802.11b specification. This is overwhelmingly faster than the maximum speed of 28.8 Kbps of the second generation mobile communication system PDC-P or the maximum speed of 384 Kbps of the third generation mobile communication system IMT-2000 (W-CDMA communication system).

Further, the hot spot service using wireless LANs employs flat fee billing plans, and thus offers cost advantages over the above-mentioned conventional systems which employ usage-based billing plans. Under the current circumstances, the hot spot service can only be used in limited areas, but this problem will be solved soon as the service areas are expanded to cover large areas where people gather.

The current hot spot service is based on the Internet Protocol version 4 (IPv4). However, with rapidly increasing numbers of terminals on IP networks in recent years, there is a concern that the IPv4 address space will soon be exhausted, and it is expected that the hot spot service will also transfer to the Internet Protocol version 6 (IPv6) that provides a greatly expanded address space.

FIG. 1 is a diagram showing one example of a network constructed using a wireless LAN and IPv6. The following description is given by taking the hot spot service as an example.

In FIG. 1, an IP terminal 10 is a notebook PC, PDA, or the like that has a capability to communicate with the wireless LAN. The IP terminal 10, for example, on the move, is connected to a wireless LAN access point (AP) 21 installed at a railway station or a coffee shop.

The access point 21 covers a hot spot area 20 within a prescribed range from the access point 21, and provides services, such as high-speed Internet connection service and an information service limited to that area, to the IP terminal 10 located within the hot spot area 20.

The access point 21 is connected to an access router (AR) 31, to which it is subservient, for connection to the Internet 40 via an operator network 30. The access router 31 is installed at a designated location, for example, within a station or a department store, or at an Internet service provider (ISP), a telephone switching office, or the like. The operator network 30 is constructed by interconnecting a plurality of such access routers.

An authentication server 32, which is installed at a particular location within the operator network 30, centrally processes user authentication of every IP terminal 10 located in each hot spot area 20. The IP terminal 10 whose user identity is authenticated by the authentication server 32 is permitted to access the Internet 40 and to perform communications such as Internet telephone (Voice over IP) with a corresponding node 41 by utilizing the high speed capability of the wireless LAN.

FIG. 2 is a diagram showing one example of an IPv6 connection sequence on the wireless LAN. FIG. 3 shows router advertisement message format.

In FIG. 2, when the IP terminal 10 moves into the hot spot area 20, it detects radio waves being radiated from the wireless LAN access point 21 (S101). Thereupon, the IP terminal 10 initiates connection processing (association) with the access point 21 (S102).

When a connection request is received from the IP terminal 10, the access point 21 requests the authentication server (RADIUS server) 32 to process the user authentication of the IP terminal 10 (S103). When the user authentication is successfully done, the IP terminal 10 is notified accordingly (S104) and, at the same time, the access point 21 opens its port and allows the IP terminal 10 to access the IP network (S105).

Thereafter, when the IP terminal 10 receives a router advertisement message that the access router 31 is broadcasting periodically (S106) (refer, for example, to Document 1), the IP terminal 10 generates its own IP address to be used within the hot spot area 20 where it is located, by using the route prefix contained in the user prefix field (Prefix) of the router advertisement message shown in FIG. 3 (S107) (refer, for example, to Document 2).

Using this IP address, the IP terminal 10 initiates communication based on IPv6 with the correspondent node 41 via the IP network including the Internet 40, etc. (S108). IPv6 is defined by its standardization body IETF (Internet Engineering Task Force) (refer, for example, to Document 3).

The predominantly used wireless LAN authentication method is based on IEEE 802.1x defined by its standardization body IEEE (Institute of Electronics and Electrical Engineers). The standard includes authentication mechanisms such as EAP-TLS (Extensible Authentication Protocol—Transport Level Security), EAP-TTLS (Tunneled TLS), PEAP-TLS (Protected EAP protocol), EAP-MD5, or the like.

The authentication based on IEEE 802.1x is implemented by three nodes, i) node (IP terminal) that requires authentication for network access, ii) node (AP) that controls the network access at packet level, and iii) node (authentication server) that permits the network access. The above-described configuration is based on such node configuration.

FIG. 4 shows one example of a prior art configuration for IP connection processing in the IP terminal 10.

In FIG. 4, an interface section 11 performs wireless communication with the access point (AP) 21 by using a prescribed wireless communication scheme. A kernel section 12 shows the kernel section of a conventional IPv6-compliant operating system (OS), and contains an authentication processing section 14 and an IP processing section 13.

The authentication processing section 14 performs user authentication processing with the authentication server 32 via the access point (AP) 21. The IP processing section 13, upon receiving the first router advertisement message after successful completion of the user authentication, generates its own IP address by using the route prefix contained in the message. The sections 13 and 14 each operate individually in accordance with the connection sequence shown in FIG. 2.

In wireless LAN environments that provide hot spot services, there is an increasing need to support handover (switching from one access point to another) which occurs when the user moves around. According to the above-described wireless LAN, the communication session is not disconnected when effecting switching from one access point to another within the same IP subnet (served by the same access router).

However, in the case of access point switching across different IP subnets (served by different access routers), the communication session is disconnected and the IP connection processing has to be initiated once again, because the IP address of the IP terminal 10 changes. As a result, Mobile IP technology that can achieve mobility that does not involve communication disconnections in a wireless LAN environment becomes important. Mobile IP is a mechanism for managing mobility at IP level, and has the advantage that the communication session will not be disconnected even if the IP address changes, as will be described in the following example.

FIG. 5 is a diagram showing one example of another network constructed using a wireless LAN and IPv6. The following description is given by taking Mobile IPv6 as an example.

The only differences between FIG. 5 and the previously given FIG. 1 are that the IP terminal 10 in FIG. 1 is referred to as a mobile node (MN) 10' in FIG. 5, and that a home agent (HA) 42 is connected to the Internet 40 in FIG. 5. Though differently named, the IP terminal 10 and the mobile node (MN) 10' actually have the same functions.

The home agent 42 manages the location (area) of the mobile node 10'. For this purpose, the mobile node 10' has a permanent IP address (HoA: Home Address) unique to it and an IP address (CoA: Care of Address) which is generated when the mobile node 10' has moved into an area served by another access router (AR) 31.

The mobile node 10' notifies the generated IP address (CoA) to the home agent 42 which then updates the current IP address (CoA) to the IP address (CoA) thus notified. By so doing, communication with any destination mobile node 10' is performed by way of the home agent 42 by using the permanent IP address (HoA) of that destination mobile node 10' regardless of its current location.

The home agent 42 that received data with the permanent IP address (HoA) attached thereto forwards the data through tunneling by attaching the IP address (CoA) of the area where the destination mobile node 10' is currently located. Similarly, the destination mobile node 10' performs communication with the originating mobile node 10' by way of the home agent 42 by using the permanent IP address (HoA) of the originating mobile node 10'.

FIG. 6 is a diagram showing one example of a Mobile IPv6 handover sequence in the wireless LAN environment.

In FIG. 6, the mobile node 10' is communicating with a corresponding node (CN) 41' by way of the home agent 42 in the area served by the current access point (current AP) 21 (S201). Next, the mobile node 10' moves to a new area and detects radio waves being emitted from another access point (new AP) 21' (S202 and 203). Thereupon, the mobile node 10' initiates connection processing (association) with the new access point 21' (S204).

The user authentication processing carried out in the subsequent steps S205 to 209 is the same as that carried out in the previously described steps S103 to 107 in FIG. 2. Next, the mobile node 10' notifies the home agent 42 of the IP address (CoA) of its own generating by sending a Binding_Update message (S210). In response, the home agent 42 updates the current IP address (CoA) to the new one, and notifies the mobile node 10' of the completion of the updating by returning a Binding_Acknowledgment message (S211).

The mobile node 10' then resumes communication in the area served by the new access point 21' and continues communication with the correspondent node (CN) 41' by way of the home agent 42 (S212). As the home agent 42 centrally performs updating management and switching control as described above, the communication session is not disconnected even when the IP address is changed.

The Mobile IP standardized by IETF RFC 2002 is based on IPv4 (refer, for example, Document 4) but, as the basic operation of the Mobile IPv6 is the same as that of the Internet Draft Mobile IP based on IPv6, the above example has been described for the case of the Mobile IPv6.

Document 1: Internet<www.ietf.org/rfc/rfc2461.text>
Document 2: Internet<www.ietf.org/rfc/rfc2462.text>
Document 3: Internet<www.ietf.org/rfc/rfc2460.text>
Document 4: Internet<www.ietf.org/rfc/rfc3344.text>

The network configuration using the wireless LAN and IPv6 shown in FIG. 1 has had the problem that it takes much time to process IPv6 connections in the wireless LAN environment that requires user authentication. The reason is that, as shown in the IPv6 connection sequence of FIG. 2, even when the user authentication is done successfully, and is ready to initiate communication (S105), the IP connection processing is not initiated until the router advertisement message is received from the access router 31 (S106 to 108).

RFC 2461 "Neighbour Discovery for IPv6" standardized by the IETF defines the time interval at which the router broadcasts the router advertisement message. According to the definition, the default interval is once in every 198 seconds, and the minimum interval is once in 3 seconds. This means that, depending on the transmission timing of the router advertisement message, there is a delay of several seconds to about 3 minutes from the completion of the user authentication to the reception of the router advertisement message.

This has resulted in the problem that, despite successful completion of the user authentication, IP communication using browser or communication applications on the IP terminal 10 cannot be initiated. This problem has been attributed not only to the delay in receiving the router advertisement message from the network side, but also to the IP connection processing configuration of the prior art IP terminal 10.

As explained for the prior art configuration shown in FIG. 4, in a conventional IPv6-compliant operating system (OS) the authentication processing section 14 and the IP processing section 13 contained in the kernel each operate individually in accordance with the connection sequence shown in FIG. 2. Accordingly, when the user authentication processing is completed, the authentication processing section 14 terminates its process, and the IP connection processing is initiated by using the reception of the router advertisement message as a trigger.

In this way, the prior art configuration does not have any means for actively requesting the network for an early transmission of the router advertisement message, or if such means is provided, the authentication processing section and the IP processing section are not configured to operate in a cooperative manner; accordingly, if a request packet (router solicitation) is transmitted before completion of the authentication, the packet will be discarded at the access point (AP), leaving no choice but to wait until the router advertisement message is received.

This problem becomes more serious when mobility is added to the IP terminal 10. This is because, as the mobile terminal 10 moves, the access router 31 on the network side frequently changes and, each time this happens, the communication in progress is disconnected and the IP connection processing, including the user authentication processing, is requested once again. In view of this, in the example of FIG.

5, the network configuration based on the Mobile IPv6 is used in the wireless LAN environment, in an attempt to prevent communication disconnections associated with IP address changes.

However, as is apparent from the IP connection sequence of FIG. 6, in the current wireless LAN environment, reconnection processing at IPv6 level, including the user authentication processing, necessarily occurs when the mobile node moves across different access routers. Accordingly, if it takes much time to complete the processing, a similar problem to that in the example of FIG. 1 can occur even when the Mobile IPv6 is employed.

For example, if the processing time becomes too long, the communication with the correspondent node 41' is disconnected. Further, if a handover occurs while the user is in the process of communication, the application program is temporarily shut off and remains off until the IP communication is resumed; in particular, in the case of a realtime application such as Internet telephone (VoIP) or a video stream, a prolonged non-communication time causes a serious problem.

The above problem becomes more serious when the user authentication processing is performed using encrypted packets as in PEAP-TLS. In this case, as the reception of an authentication packet has to be followed by the process of deciphering the result of the authentication, there has been the problem that high-speed handover becomes difficult because of increased delay in recognizing the successful completion of the authentication.

In the above cases, there is a need to further enhance the speed of the IP connection processing in the wireless LAN environment by reducing the processing burden on an access point (AP) which is accessed by a plurality of users.

SUMMARY OF THE INVENTION

In view of the above-enumerated problems, it is an object of the present invention to provide an IP connection processing device that achieves high-speed IP connection processing; for this purpose, in addition to the existing authentication processing section and IP processing section, a high-speed IP connection processing section for operating these sections in a cooperative manner is newly provided in the IP connection processing configuration of an IP terminal or mobile node, and the high-speed IP connection processing section immediately activates the IP processing section upon detecting the completion of user authentication in the authentication processing section.

More specifically, upon detecting the successful completion of the user authentication, the activated IP processing section or the high-speed IP connection processing section itself immediately requests a router advertisement message from the network. Using the router advertisement message received in response, the subsequent IP connection processing is started early.

Alternatively, upon detecting the completion of the user authentication, irrespective of the success or failure of the authentication, or more specifically, upon detecting a packet containing authentication completion information, the activated IP processing section or the high-speed IP connection processing section itself immediately requests a router advertisement message from the network; this configuration further includes a means for preventing unnecessary access from occurring at the time of a user authentication failure.

As a result, high-speed IP connection processing is achieved without changing the existing IP network configuration in the wireless LAN environment. The IP network here includes any network in the wireless LAN environment, that is, the IPv6 network, the Mobile IPv6 network, and the traditional IPv4 network.

According to the present invention, there is provided an IP connection processing device, for processing a connection to an IP network that requires user authentication for connection to the network, comprising: detecting means for detecting authentication completion; acquiring means for acquiring an authentication result; and IP connection means for initiating or resuming IP connection processing upon successful completion of the authentication.

According to the present invention, there is also provided an IP connection processing device, for processing a connection to an IP network that requires user authentication for connection to the network, comprising: detecting means for detecting authentication completion (more specifically, a packet containing authentication completion information); and IP connection means for initiating or resuming IP connection processing upon detection of the packet containing the authentication completion information.

According to the present invention, there is also provided an IP connection processing device for processing a connection to an IP network that requires user authentication for connection to the network, comprising: detecting means for detecting a packet containing an encryption key used for communication with an access point; and IP connection means for initiating or resuming IP connection processing upon detection of the packet containing the encryption key.

The IP connection processing device further comprises: means for detecting a failure of user authentication; and means for inhibiting the IP connection processing after detecting the authentication failure.

BRIEF DESCRIPTION OF THE DRAWINGS

The present invention will be more clearly understood from the description as set forth with reference to the accompanying drawings.

FIG. 9 is a diagram showing an example (2) of a process flow in the authentication processing section.

FIG. 10A is a diagram showing an example (1) of a process flow for authentication completion detection and authentication result acquisition.

FIG. 17A is a diagram showing the general function (1) of an intermediate driver.

FIG. 17B is a diagram showing the general function (2) of an intermediate driver.

FIG. 32 is a diagram showing one example of an access restriction table.

DESCRIPTION OF THE PREFERRED EMBODIMENTS

Figure 7:
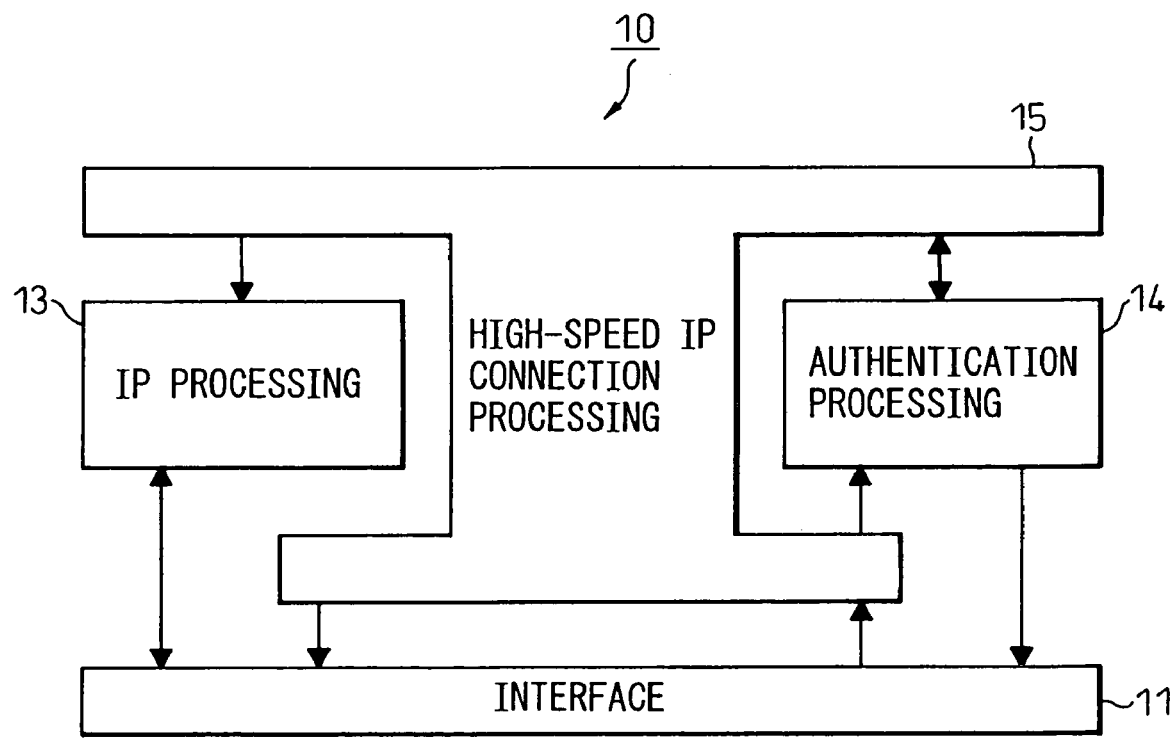
FIG. 7 is a diagram showing a first basic configuration of an IP connection processing device according to the present invention.

FIG. 7 is a diagram showing a first basic configuration of an IP connection processing device incorporated in an IP terminal or a mobile node according to the present invention.

Figure 4:
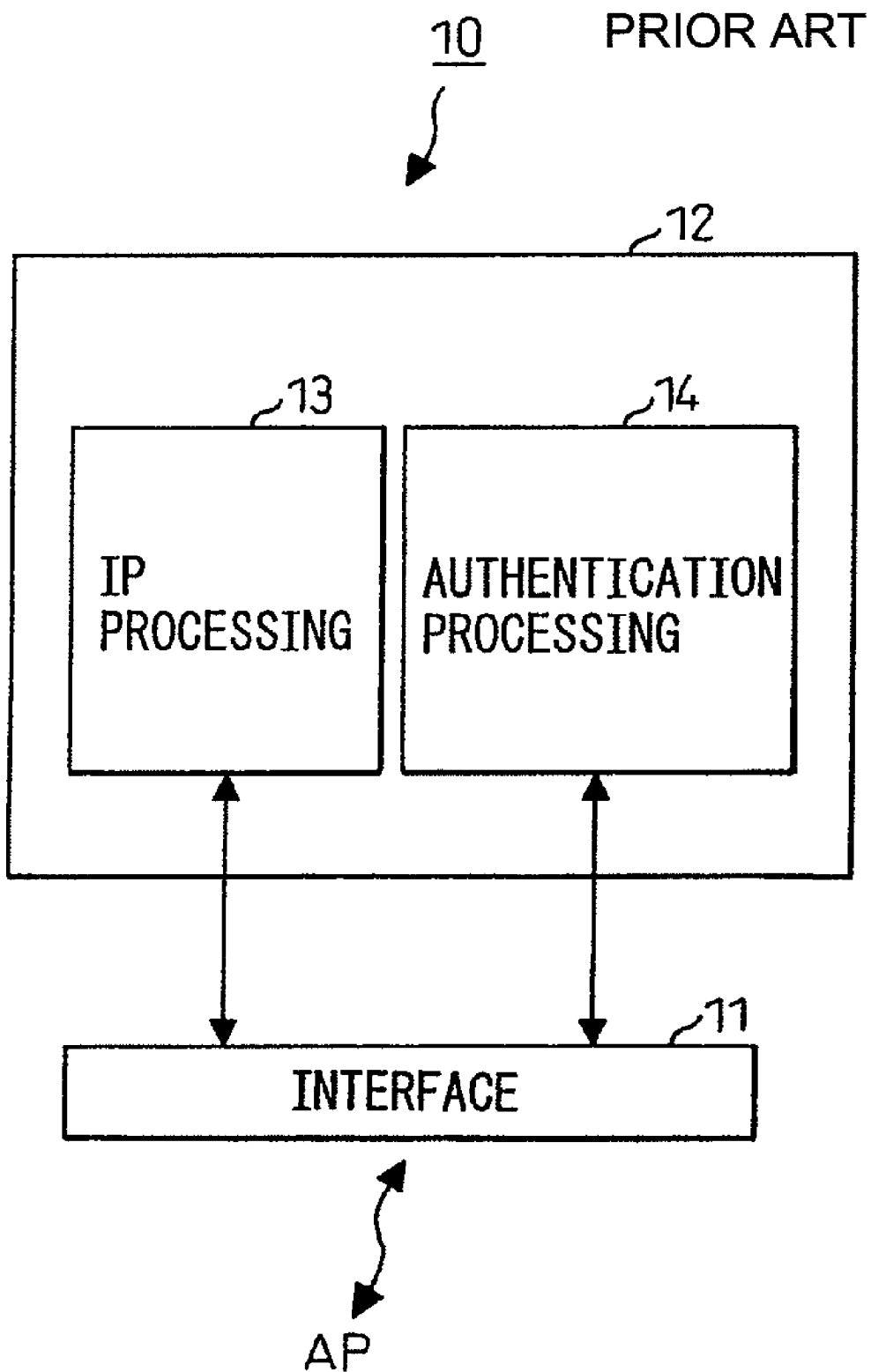
FIG. 4 is a diagram showing one example of a prior art configuration for IP connection processing in an IP terminal.
Figure 5:
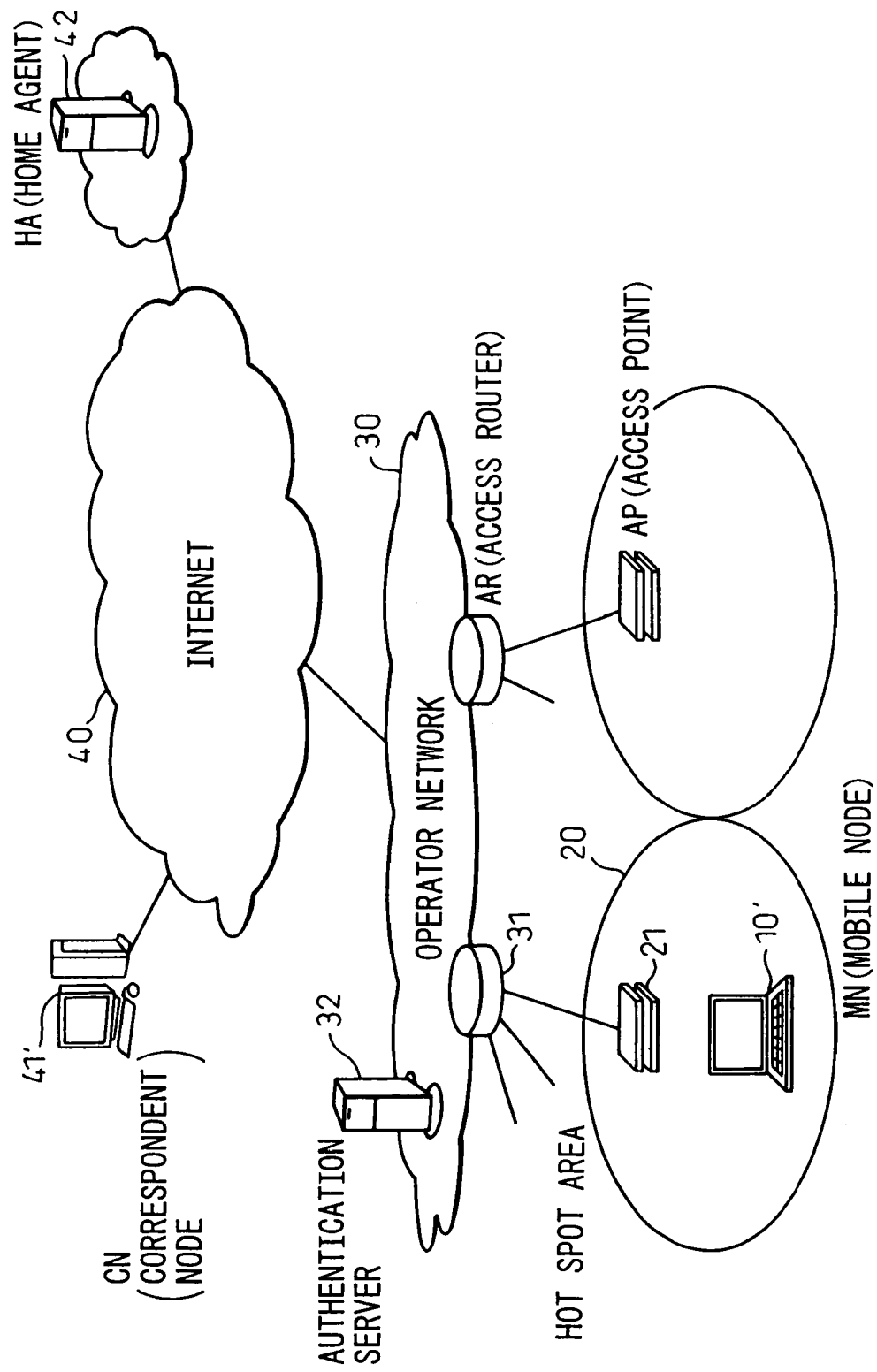
FIG. 5 is a diagram showing one example of another network constructed using a wireless LAN and IPv6.

In FIG. 7, the interface section 11, the authentication processing section 14, and the IP processing section 13 are the same as those in the prior art configuration described with reference to FIG. 4. A high-speed connection processing section, which is newly added in the present invention, operates the existing authentication processing section 14 and IP processing section 13 in a cooperative manner and thereby achieves high-speed IP connection processing.

Figure 8:
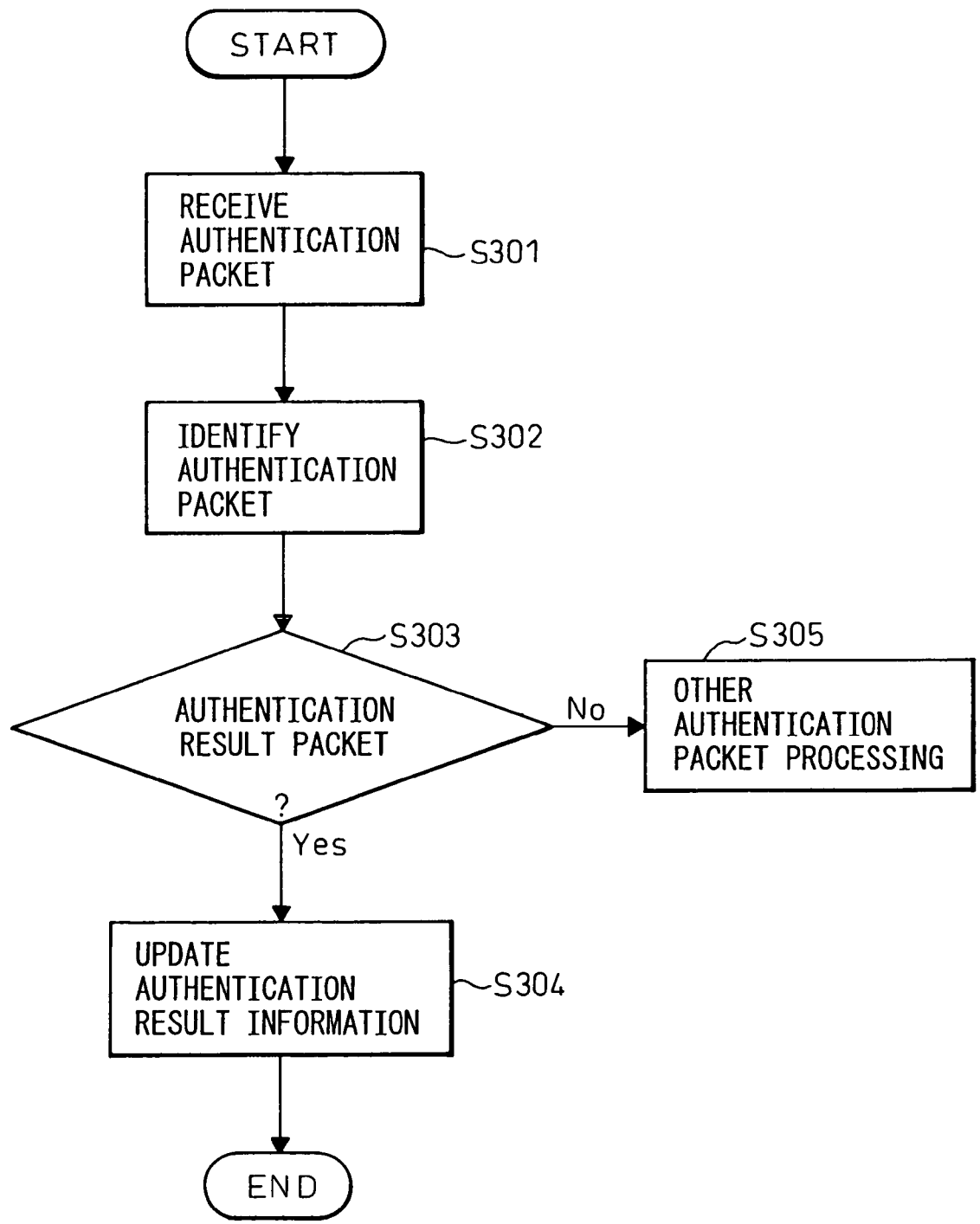
FIG. 8 is a diagram showing an example (1) of a process flow in an authentication processing section.

FIGS. 8 and 9 are diagrams each showing an example of a process flow in the authentication processing section 14. FIG. 8 shows an example of a flow for receiving an authentication result packet, while FIG. 9 shows an example of a flow for receiving an authentication completion packet.

In FIG. 8, when an authentication packet is received, the packet is identified and, if the packet is an authentication result packet, authentication result information managed in the authentication processing section 14 is updated (S301 to 304).

In FIG. 9, when an authentication packet is received, the packet is identified and, if the packet is an authentication completion packet, authentication status managed in the authentication processing section 14 is updated (S311 to 314). If the packet is neither one nor the other, the process is terminated (S305 and 315). On the other hand, if the received authentication packet is one that contains both the authentication result and the authentication completion information, both the processes of FIGS. 8 and 9 are carried out.

Figure 10B:
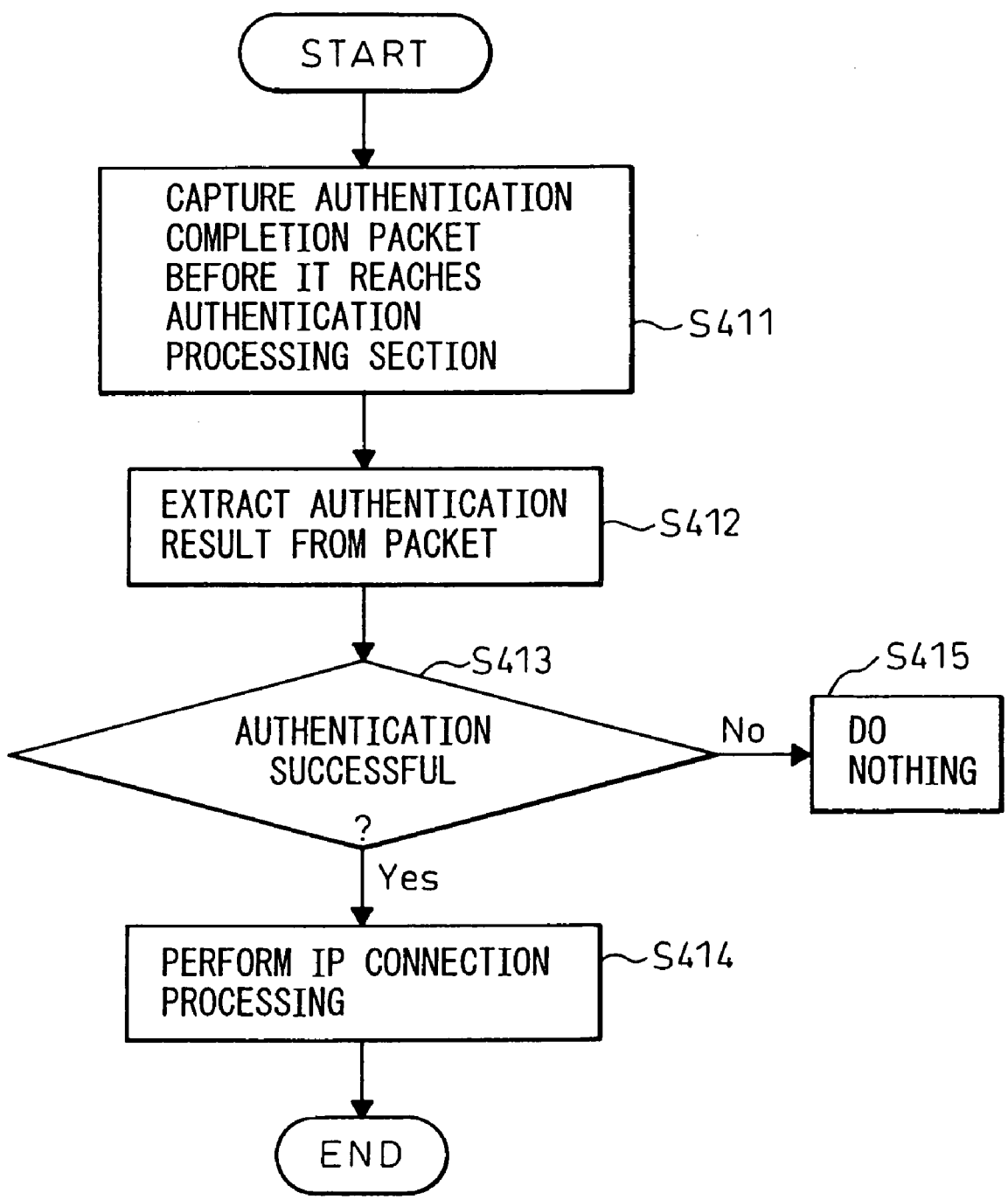
FIG. 10B is a diagram showing an example (2) of a process flow for authentication completion detection and authentication result acquisition.
Figure 11:
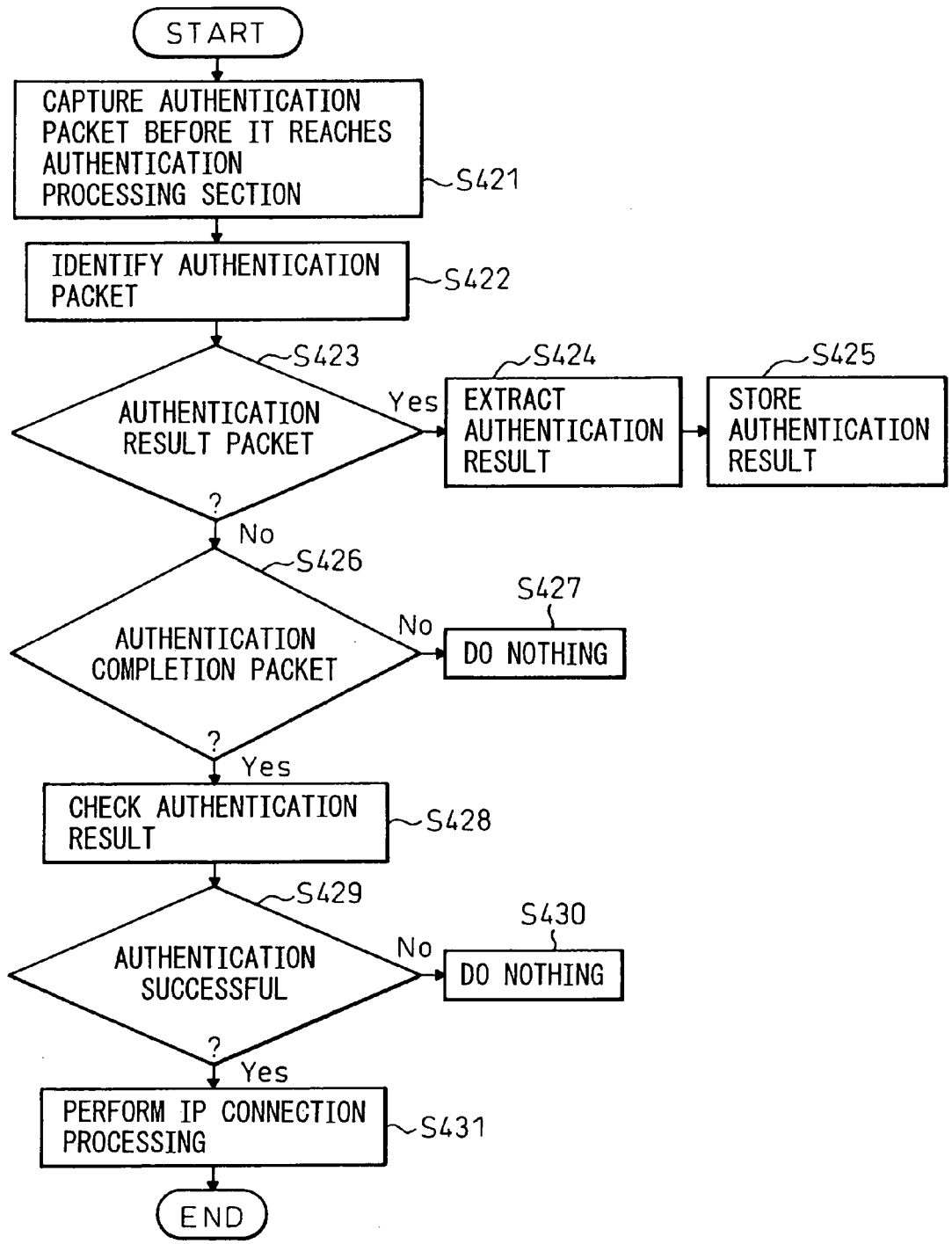
FIG. 11 is a diagram showing an example (3) of a process flow for authentication completion detection and authentication result acquisition.
Figure 12B:
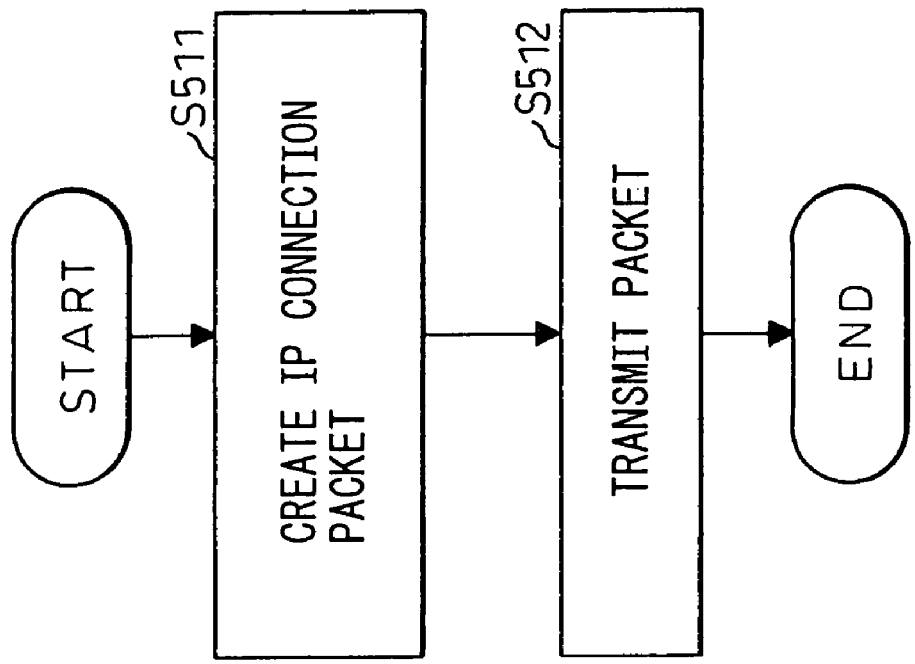
FIG. 12B is a diagram showing an example (2) of a process flow of an IP connection processing function.

FIGS. 10A to 12B are diagrams each showing an example of a process flow in the high-speed IP connection processing section 15. FIGS. 10A, 10B and 11 show process flow examples for an authentication completion detection function and an authentication result acquisition function which relate to the cooperation with the authentication processing section 14, and FIGS. 12A and 12B show examples of a process flow of an IP connection processing function which relates to the cooperation with the IP processing section 13.

FIG. 10A shows an example of a process flow in which the high-speed IP connection processing section 15 requests the authentication status and authentication result from the authentication processing section 14.

The high-speed IP connection processing section 15 requests the authentication status and authentication result from the authentication processing section 14 (S401 and 402); if the authentication is completed, and the authentication is successful, IP connection processing is performed (S403 and 404). If the authentication is unsuccessful, the process is terminated (S405). In this process, the authentication processing section 14 returns the authentication result information and the authentication status, as shown in FIGS. 8 and 9.

FIG. 10B shows an alternative method, i.e., an example of a process flow in which the high-speed IP connection processing section 15 captures (intercepts) the authentication completion packet before it reaches the authentication processing section 14.

The high-speed IP connection processing section 15 captures the authentication completion packet before it reaches the authentication processing section 14, and extracts the authentication result from that packet (S412). If the result shows that the authentication is successful, IP connection processing is performed (S413 and 414). If the authentication is unsuccessful, the process is terminated (S415). This example, as contrasted to the example of FIG. 11 below, illustrates the case in which the captured packet is one that contains both the authentication completion information and the authentication result.

FIG. 11 shows, as an alternative mode to FIG. 10B, an example of a process flow for capturing (intercepting) the authentication completion packet and the authentication result packet as separate packets before they are respectively received.

Here, the authentication packet is identified first, and if it is the authentication result packet, the authentication result is extracted and stored (S421 to 425). If it is the authentication completion packet, the contents of the stored authentication result are checked, and if the result shows "AUTHENTICATION SUCCESSFUL", IP connection processing is performed (S426 to 431).

In this way, in any of the above examples, when the authentication is completed, and the authentication is successful, the IP connection processing is immediately performed.

Figure 12A:
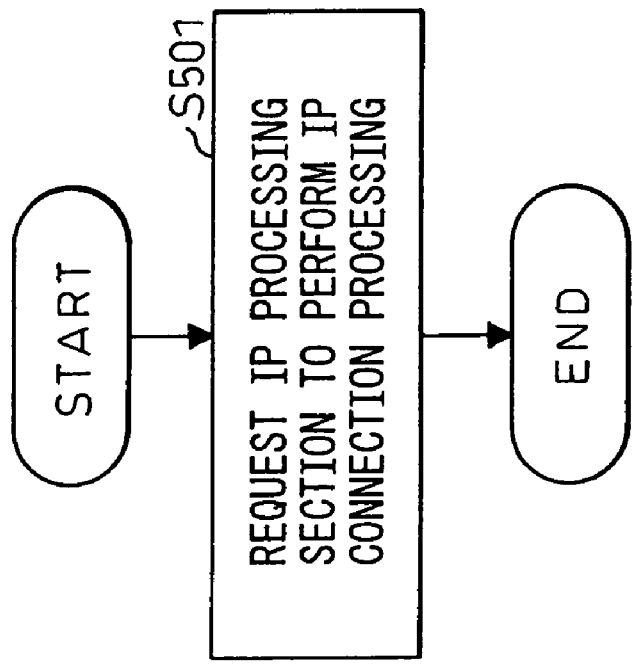
FIG. 12A is a diagram showing an example (1) of a process flow of an IP connection processing function.

FIG. 12A shows an example of a process flow in which the IP connection processing function of the high-speed IP connection processing section 15 requests the IP processing section 13 to perform the IP connection processing (S501). FIG. 12B shows an example of a process flow in which the IP connection processing function of the high-speed IP connection processing section 15 performs the processing on behalf of the IP processing section 13. In the latter case, the high-speed IP connection processing section 15 itself creates an IP connection packet and transmits it (S511 and 512).

Figure 13:
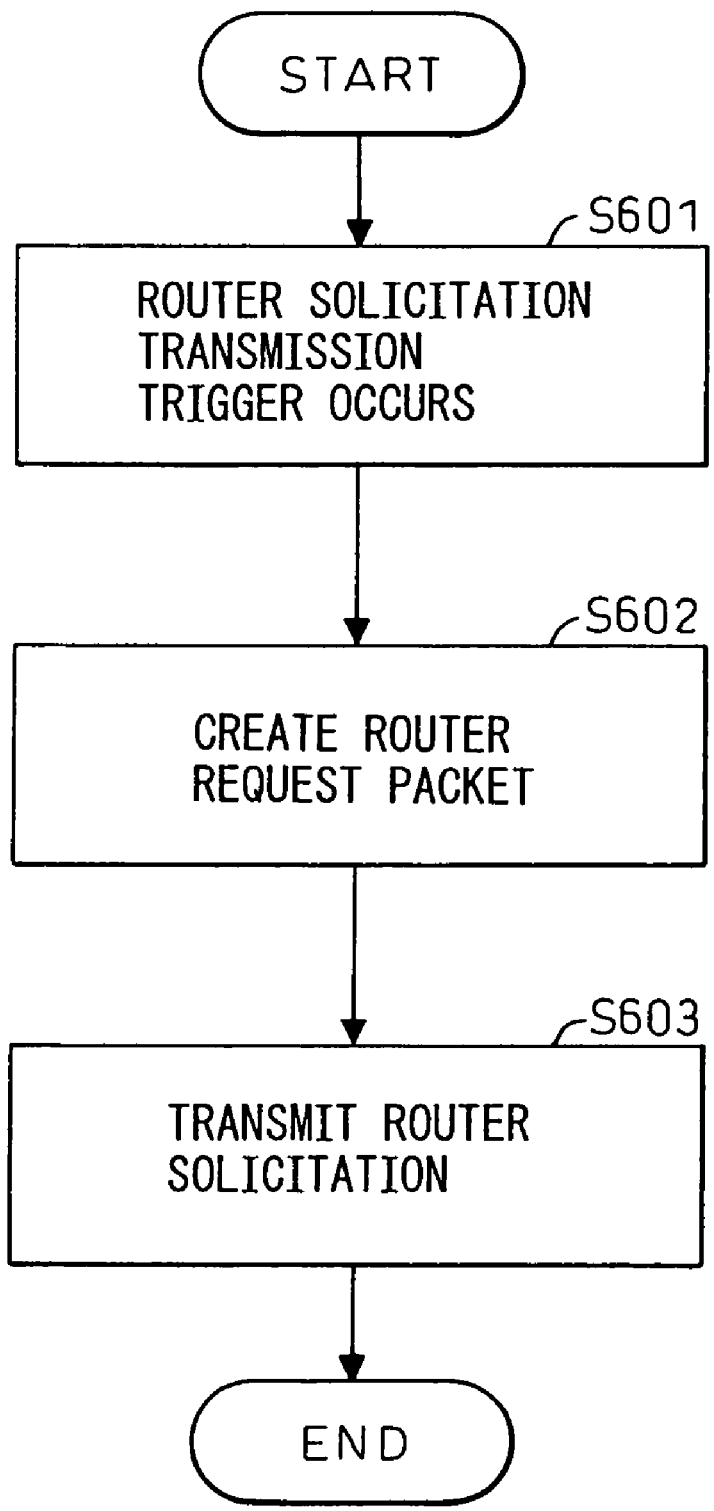
FIG. 13 is a diagram showing an example of a process flow for a router request transmission in an IP processing section.
Figure 14:
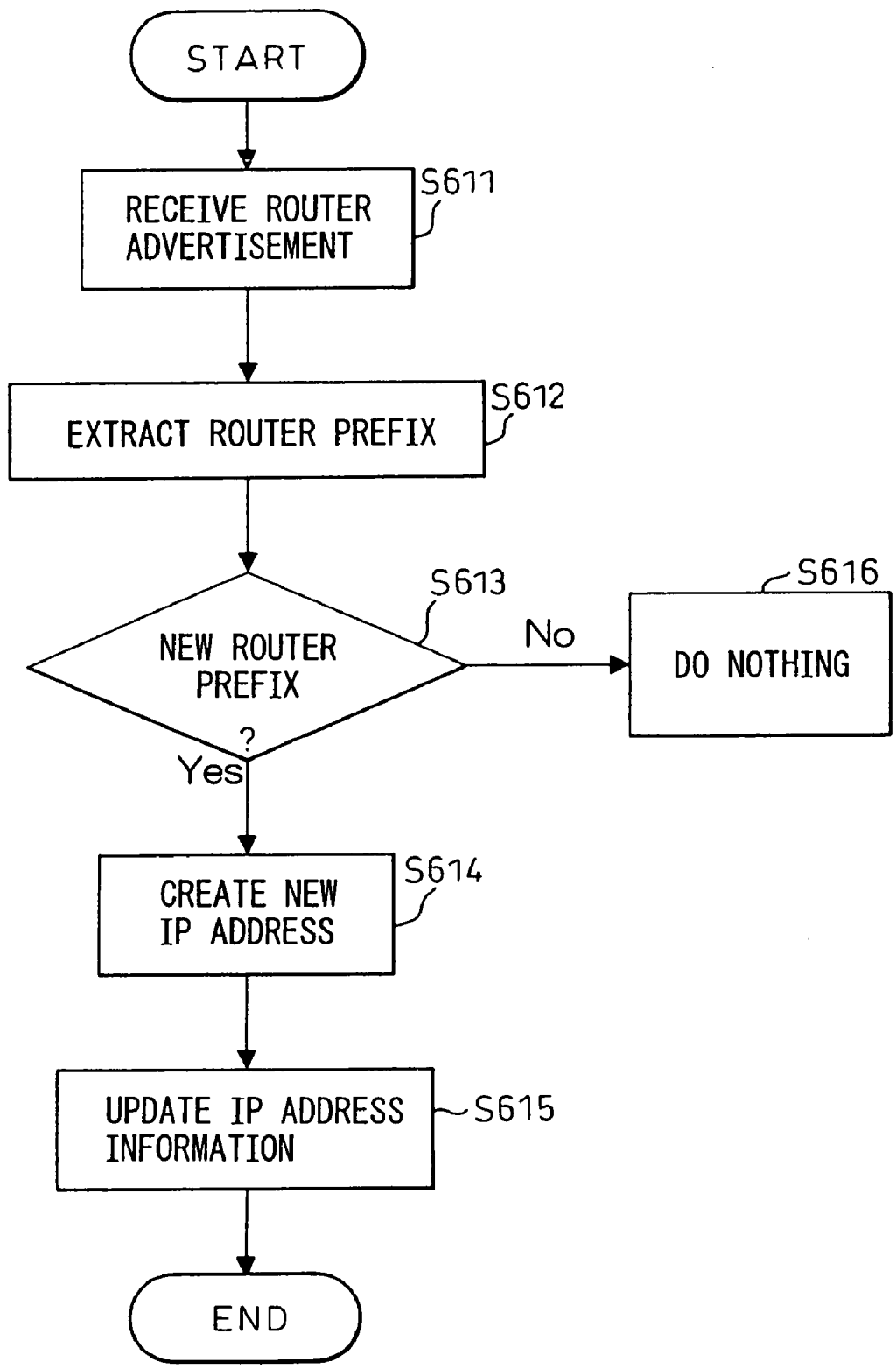
FIG. 14 is a diagram showing an example of a process flow for a router advertisement reception in the IP processing section.

FIGS. 13 and 14 are diagrams each showing an example of a process flow in the IP processing section 13. FIG. 13 shows an example of a process flow for a router request transmission, and FIG. 14 shows an example of a process flow for a router advertisement reception.

In FIG. 13, when a router request transmission trigger occurs, for example, when the request from the high-speed IP connection processing section 15 shown in FIG. 12A, the expiration of a router solicitation transmission timer, or a transmit request from an application program occurs, a router solicitation packet is created and transmitted (S601 to 603). For the router solicitation, in FIG. 14 defined in RFC 2461 "Neighbour Discovery for IPv6", a router advertisement message is received, and if the prefix contained in the message is new, a new IPv6 address is generated (CoA), and the IP address information managed in the IP processing section 13 is updated (S611 to 615). If the prefix is not new, the process is terminated.

Figure 1:
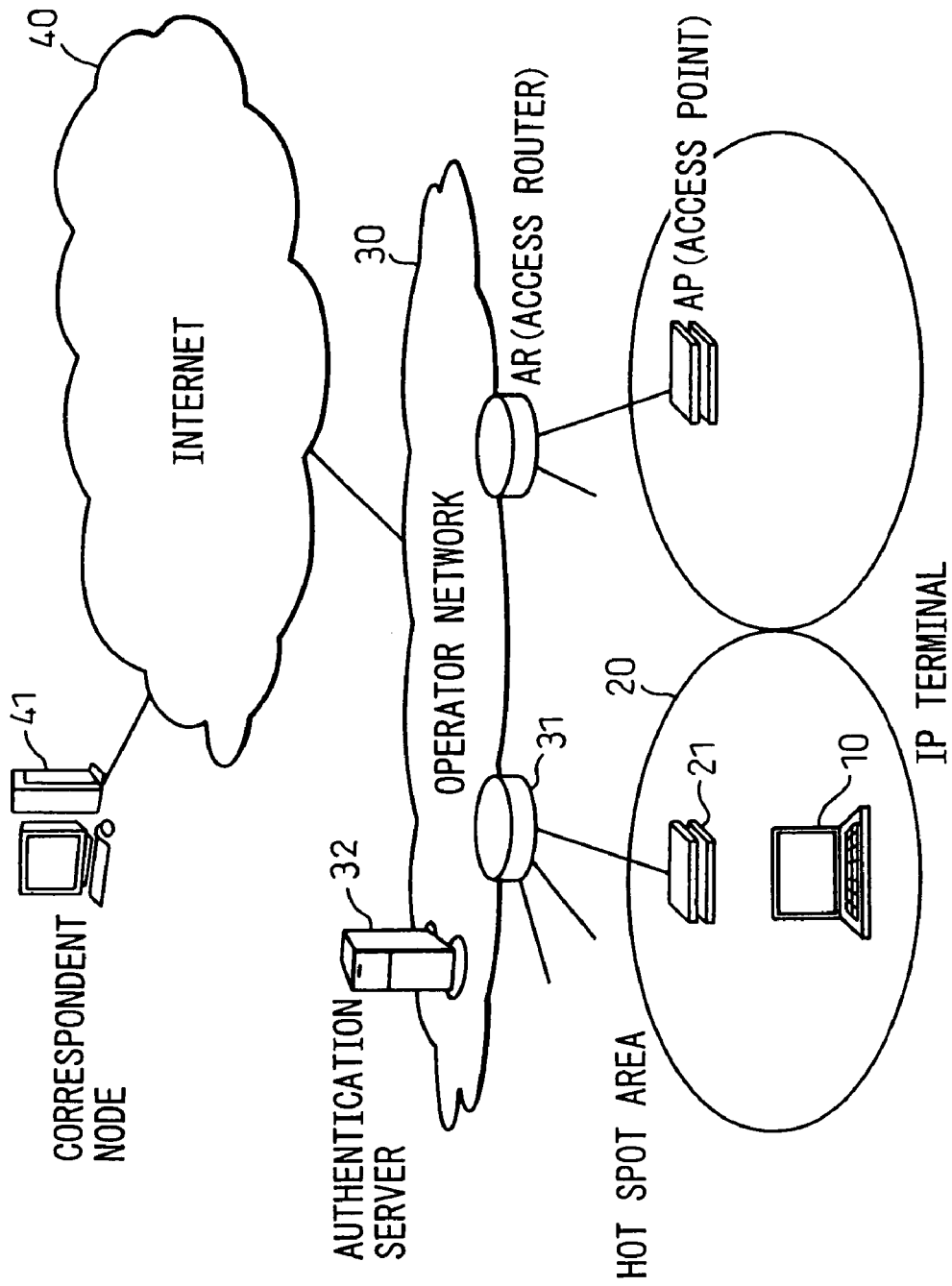
FIG. 1 is a diagram showing one example of a network constructed using a wireless LAN and IPv6.
Figure 2:
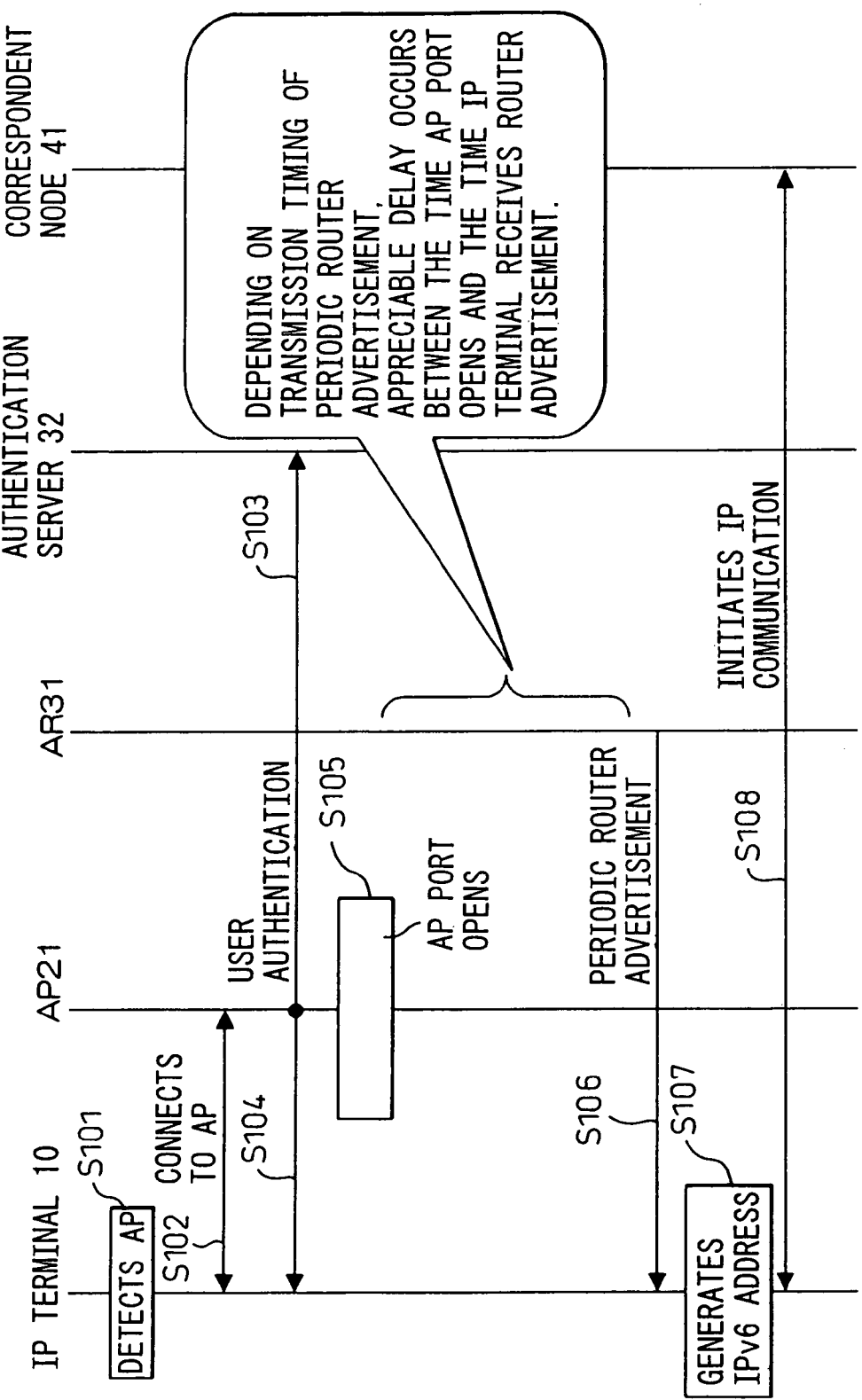
FIG. 2 is a diagram showing one example of an IPv6 connection sequence on the wireless LAN.
Figure 3:
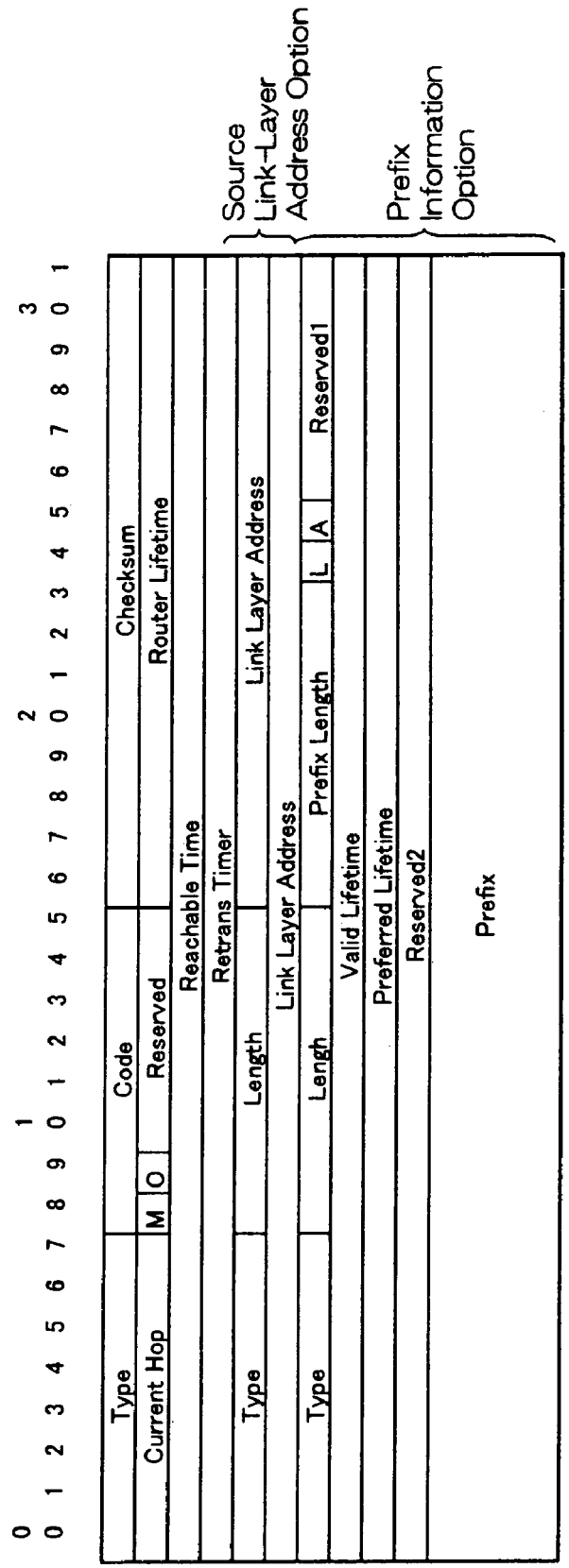
FIG. 3 is a diagram showing router advertisement message format.
Figure 15:
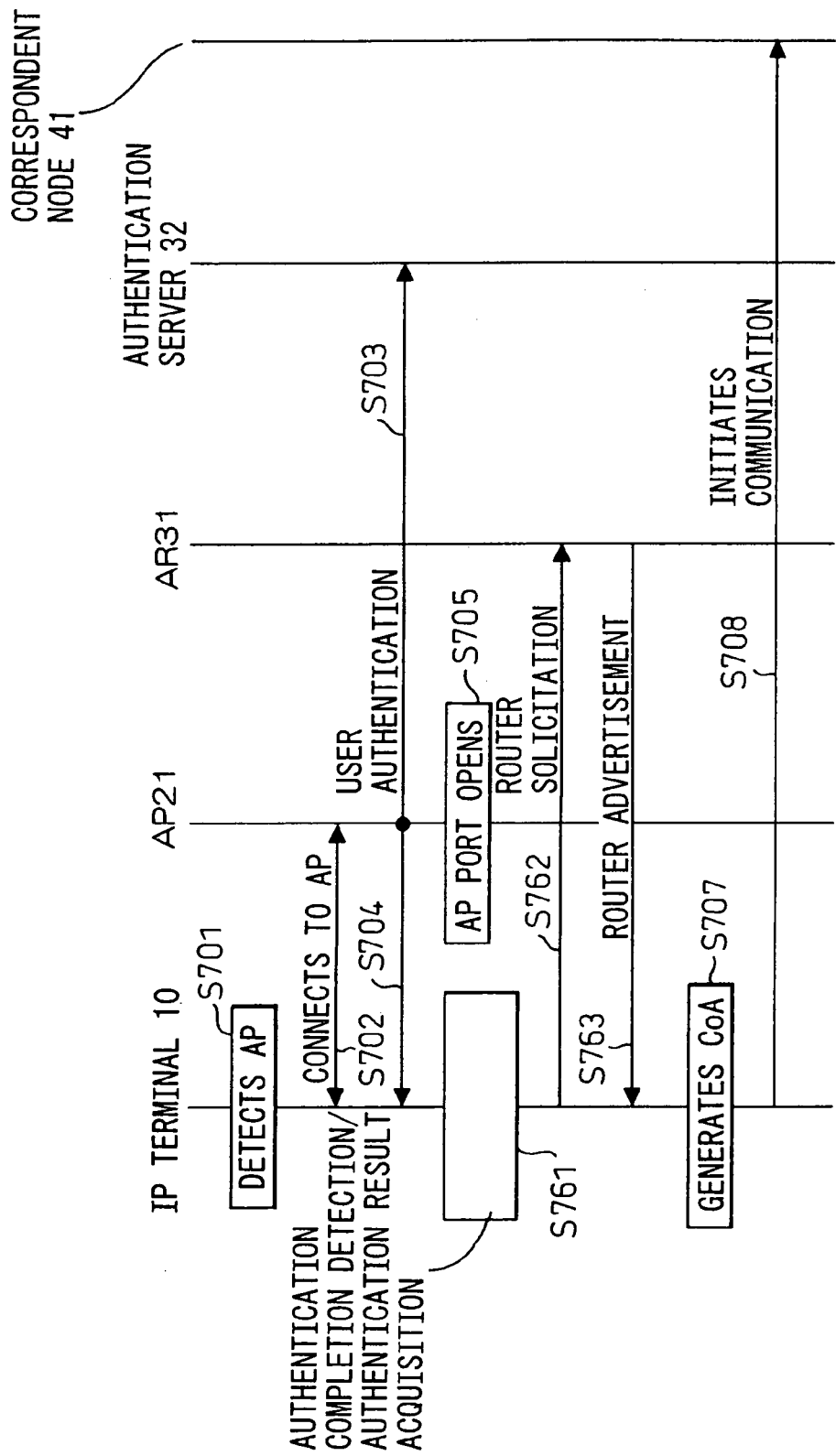
FIG. 15 is a diagram showing one example of an IPv6 connection sequence in the wireless LAN environment in accordance with the present invention.

FIG. 15 is a diagram showing one example of an IPv6 connection sequence in the wireless LAN environment in accordance with the present invention, and its contents correspond to the prior art example shown in FIG. 2.

Steps 701 to 705, S707, and 708 in FIG. 15 correspond to the respective steps 101 to 105, S107, and 108 in FIG. 2. In step 761 of FIG. 15, the IP terminal 10, which contains the IP connection processing device according to the present invention, acquires the authentication result "SUCCESSFUL" and the authentication completion information from the authentication packet transmitted to the authentication processing section 14 via the high-speed IP connection processing section 15 (S704), and instructs the IP processing section 13 to perform the IP connection processing.

The IP processing section 13 or the high-speed IP connection processing section 15 immediately creates and transmits out the router solicitation packet (S762). In response, the access router 31 transmits the router advertisement message to the IP terminal 10 (S763). After that, as shown in FIG. 2, the IP processing section 13 generates its own IP address (CoA) by using the router prefix contained in the router advertisement message, and communication with the correspondent node 41 is thus initiated in a short time (S708). In the IP connection processing device according to the present invention, the various types of high-speed IP connection processing section 15 shown in FIGS. 10A to 12B can be combined with the IP processing section 13.

Figure 16:
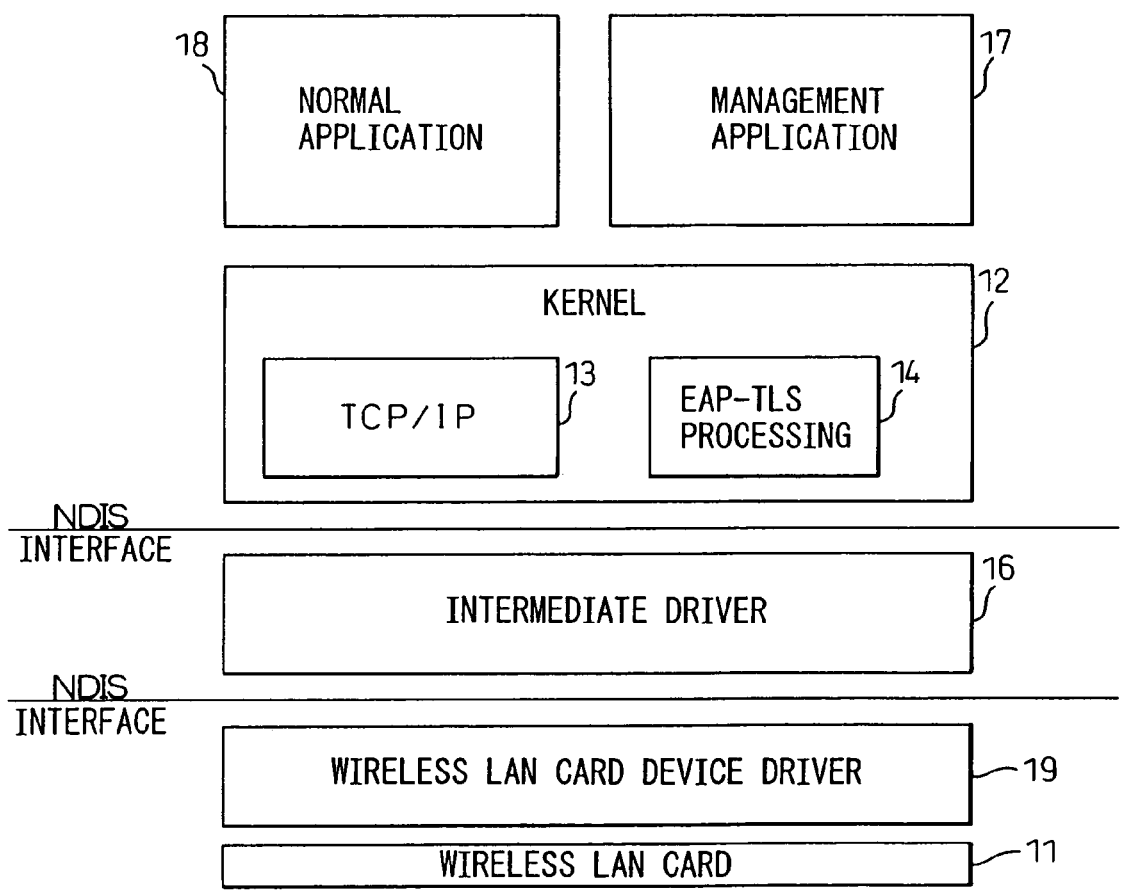
FIG. 16 is a diagram showing an embodiment in which an authentication completion packet is captured (intercepted).

FIG. 16 is a diagram showing an embodiment in which the high-speed IP connection processing section 15 shown in FIGS. 10B and 11 captures (intercepts) the authentication completion packet before it reaches the authentication processing section 14.

In the following description, Microsoft Windows XP® (hereinafter called "XP") is used as the operating system (OS). Though XP is used here, the present invention is also applicable to other OSs.

In FIG. 16, the configuration of XP is shown in simplified form. XP has an IP processing section 13 and an authentication processing section 14 inside the kernel 12, and supports EAP-TLS authentication as the authentication mechanism for IEEE 802.1x. As the authentication completion detection function and authentication result acquisition function of the high-speed IP connection processing section 15 of the present invention, requests can be issued from a management application 17 to the authentication processing section 14 shown in FIG. 10A by using an API (Application Program Interface) that drives the authentication processing section 14 in the kernel 12.

In this embodiment, the specific examples shown in FIGS. 10B and 11 will be described but, before that, a description will be given of the general function of an intermediate driver 16 with reference to FIGS. 17A and 17B. In XP, the intermediate driver 16 resides between the TCP/IP protocol stack 13 in the kernel and a device driver 19. Usually, the intermediate driver 16 simply passes packets therethrough, but the user can selectively add a prescribed driver such as packet filtering as shown in FIGS. 17A and 17B (S802 and 812). A standard interface (NDIS: Network Driver Interface Specification) for that purpose is defined.

In the present embodiment, the authentication result acquisition process and the authentication completion detection process shown in FIGS. 10B and 11 can be implemented using the intermediate driver 16 or the device driver 19. In these processes, the authentication packet received from the network is captured by the intermediate driver 16 or the device driver 19 before it reaches the authentication processing section 14 in the kernel 12 and, from the contents of the captured packet, the authentication result is directly obtained and the authentication completion is detected.

Further, in the present embodiment, the process shown in FIG. 12B, performed on behalf of the IP processing section 13 as a means for initiating or resuming the IP connection processing, can also be implemented by the internal processing of the intermediate driver 16 or the management application 17. The process performed on behalf of the IP processing section 13 refers to the process in which the high-speed IP connection processing section 15 itself creates and transmits out the router request packet.

Figure 18:
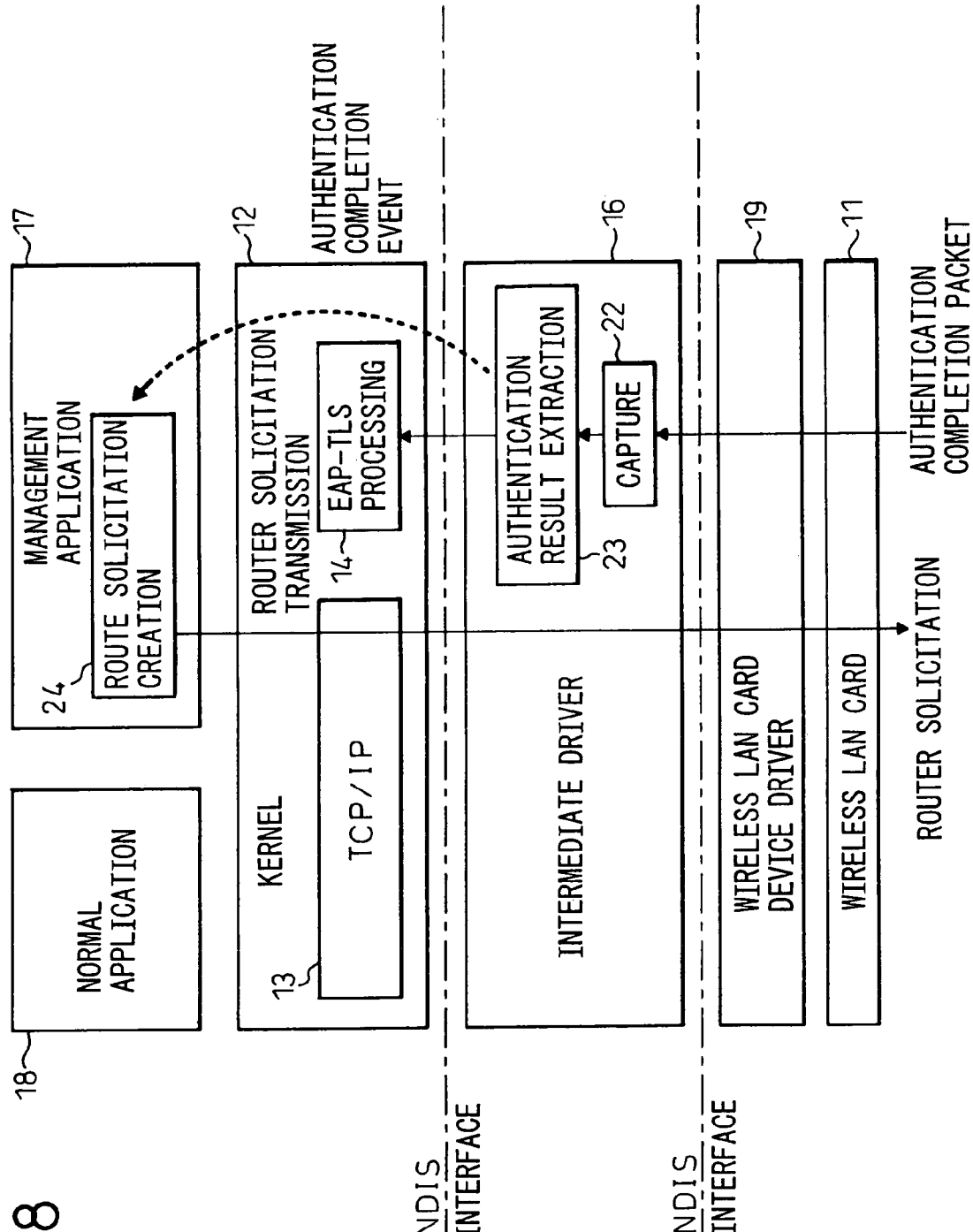
FIG. 18 is a diagram showing a further detailed configuration of the embodiment of FIG. 16.
Figure 19:
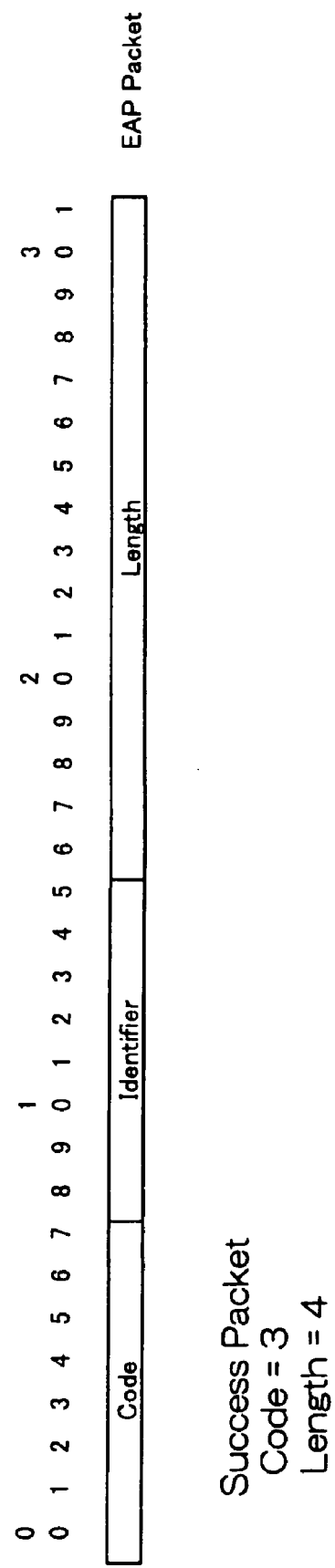
FIG. 19 is a diagram showing the format of an EAP Success packet.

FIG. 18 shows a further detailed configuration of the embodiment. FIG. 19 shows the format of an EAP Success packet, a packet signifying the completion of EAP-TLS authentication. The following description is given by taking as an example the EAP-TLS authentication completion processing on a Windows network driver.

When the EAP-TLS authentication processing is completed in accordance with a known sequence of EAP-TLS authentication processing performed between the IP terminal 10 or mobile node 10', the access point 21, and the authentication server 32, the authentication completion packet shown in FIG. 19 is transmitted to the IP terminal 10 or mobile node 10'. Successful completion of the EAP-TLS authentication can be detected by checking that the code field of the EAP Success packet is set to "3".

In the present embodiment, first a capture section 22 in the intermediate driver 16 captures the EAP-Success packet, and an authentication result extracting section 23 in the intermediate driver 16 verifies the successful completion of the authentication by checking that the code field is set to "3". The authentication result extracting section 23 notifies the management application 17 of the successful completion of the authentication as an event.

Then, a router solicitation creating section 24 in the management application 17 creates a router solicitation packet and transmits the router request message onto the network. In this example, therefore, the IP processing section 13 does not create the router solicitation. If the management application 17 is configured not to create the router solicitation, but to request the IP processing section 13 to create and transmit it, the configuration is the same as that shown in FIG. 12A.

Figure 6:
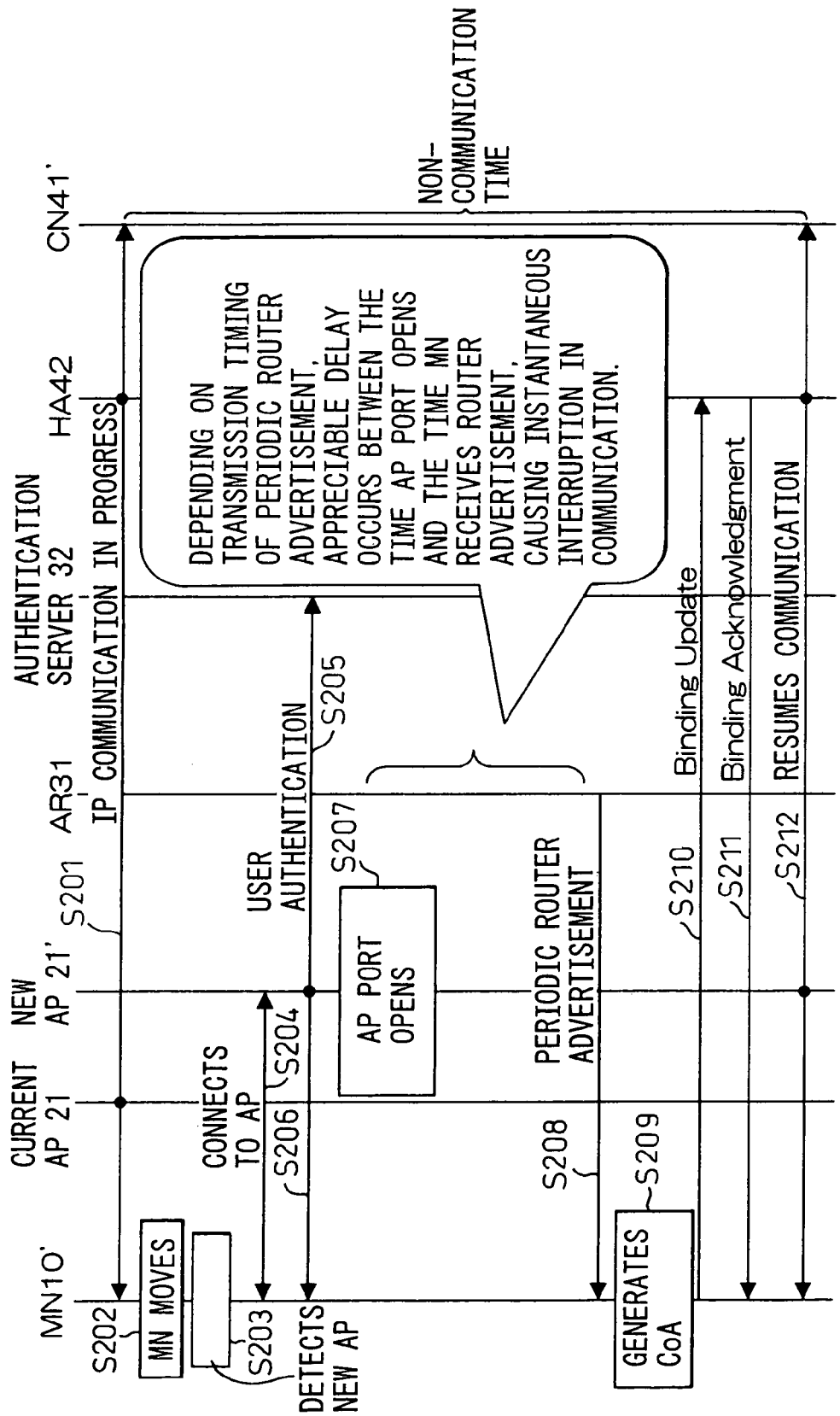
FIG. 6 is a diagram showing one example of a Mobile IPv6 handover sequence in a wireless LAN environment.
Figure 20:
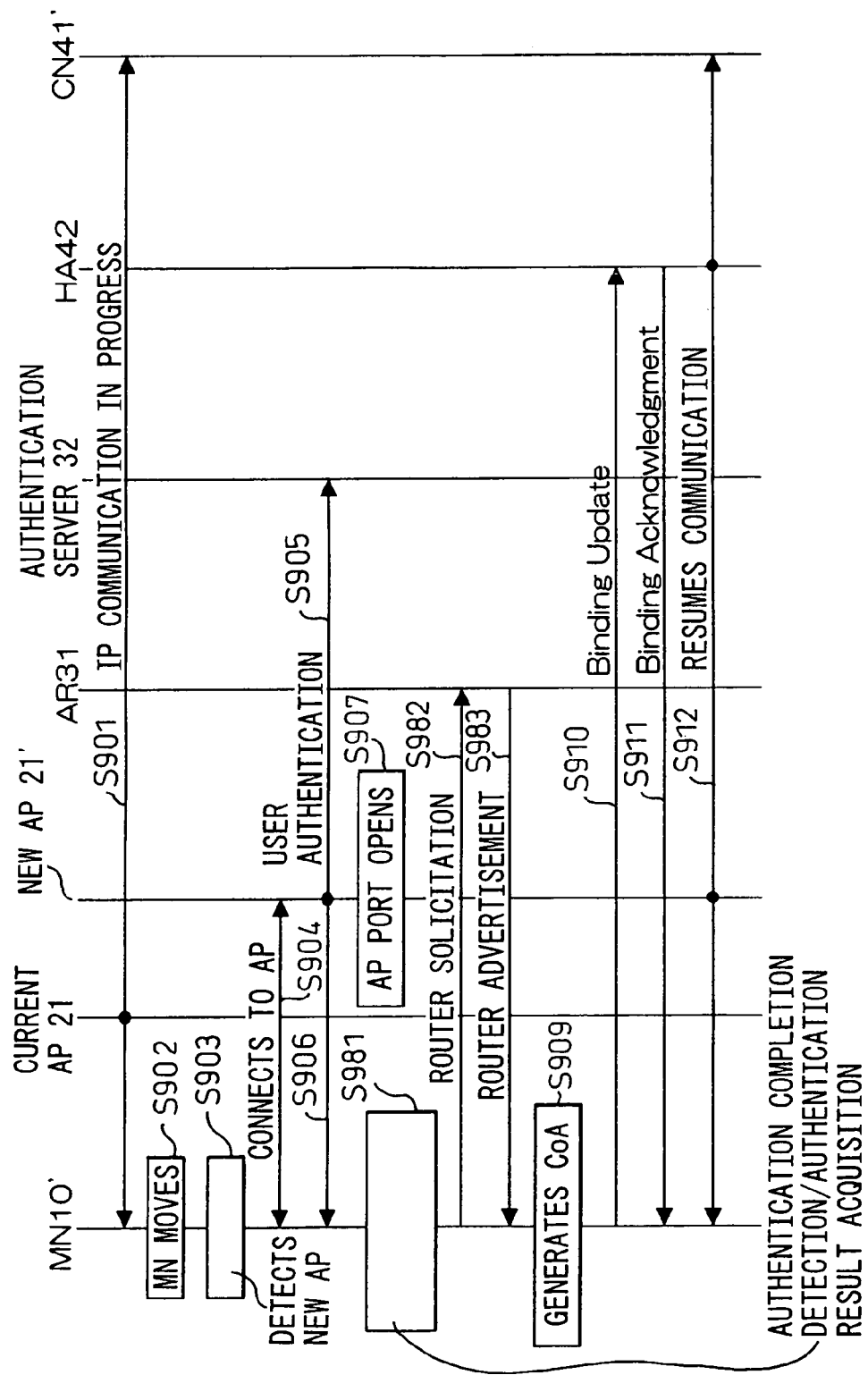
FIG. 20 is a diagram showing one example of a Mobile IPv6 handover sequence in the wireless LAN environment in accordance with the present invention.

FIG. 20 is a diagram showing one example a Mobile IPv6 handover sequence in the wireless LAN environment in accordance with the present invention, and its contents correspond to the prior art example shown in FIG. 6.

Steps 901 to 907 and 909 to 912 in FIG. 20 correspond to the respective steps 201 to 207 and 209 to 212 in FIG. 6. In FIG. 20, the management application sends out a router solicitation message based on the authentication completion and authentication successful information detected by the intermediate driver in the configuration shown in FIG. 18 (S981 and 982). In response to this solicitation, the access router 31 returns a router advertisement message (S983). Thereupon, the IP processing section 13 or the management application immediately generates the IP address (CoA) and initiates the subsequent process (S909 to 912).

In Mobile IPv6 handover, the processing performed by the high-speed IP connection processing section 15 of the present invention should not be limited to the creation and transmission of the router solicitation message described in the above embodiment. There are cases where a new IP address (CoA) has already been acquired by the time of the authentication completion. For example, in the Internet Draft "Fast Handovers for Mobile IPv6" proposed by the IETF, high-speed Mobile IPv6 handover is achieved by acquiring CoA before moving to a new access router.

In such cases, in the IP connection processing at the time of the authentication completion, a Binding_Update message may be transmitted to the home agent instead of sending the router solicitation message. Further, when performing hierarchical mobility management proposed in the Internet Draft "Hierarchical MIPv6 mobility management," the Binding_Update message may be transmitted, not to the home agent, but to a mobility anchor point which manages mobility within the local area.

While the present invention has been described above as applied to an IPv6 network, a description will be given below of embodiments in which the present invention is applied to an existing IPv4 network. From the following description, it will be seen that the present invention itself is not dependent on any particular authentication mechanism or node configuration.

Figure 21:
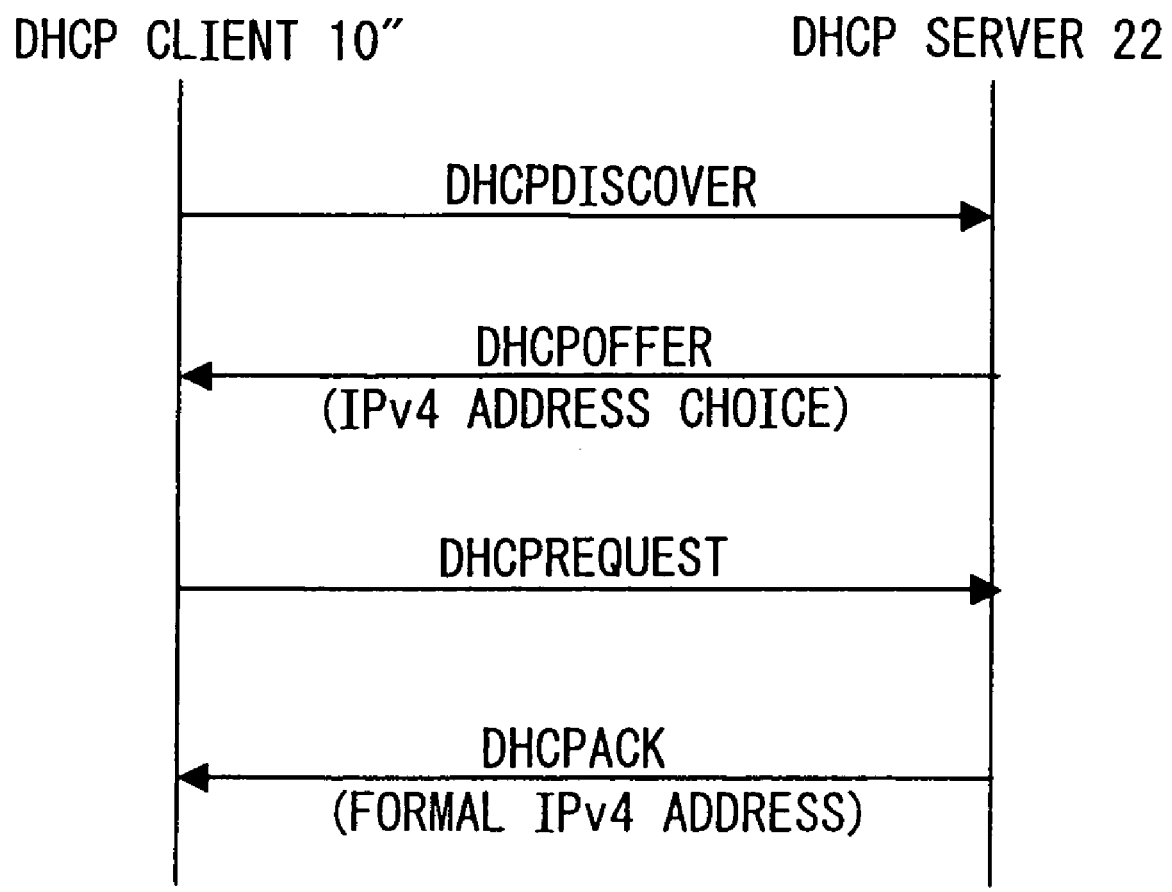
FIG. 21 is a diagram showing a DHCP sequence.

FIG. 21 shows a DHCP (Dynamic Host Configuration Protocol) sequence in which a new IP address is acquired upon completion of authentication from a DHCP server commonly used in an IPv4 network. The DHCP process is standardized in RFC 2131.

When completion of the user authentication is detected, the IP terminal 10 or mobile node 10' equipped with the IP connection processing device of the present invention immediately sends the first request "DHCPDISCOVER" from the DHCP client to the DHCP server. As a result, the DHCP sequence shown in FIG. 21 is initiated early, and the IP terminal 10 or mobile node 10' can acquire a new IP address from the DHCP server in the shortest time, thus achieving high-speed connection to the IP network.

Figure 22:
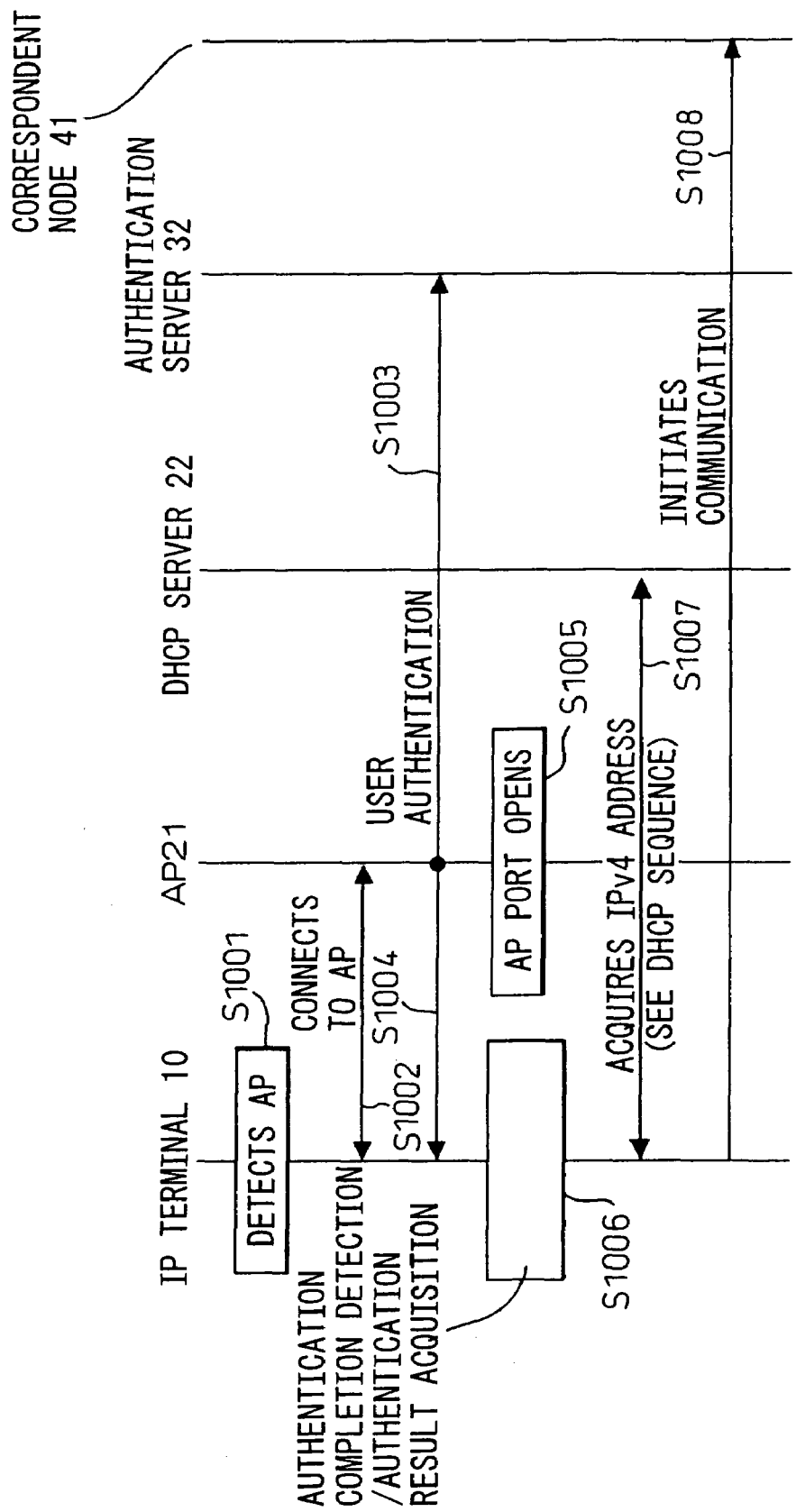
FIG. 22 is a diagram showing one example of an IPv4 connection sequence in a wireless LAN in accordance with the present invention.
Figure 23:
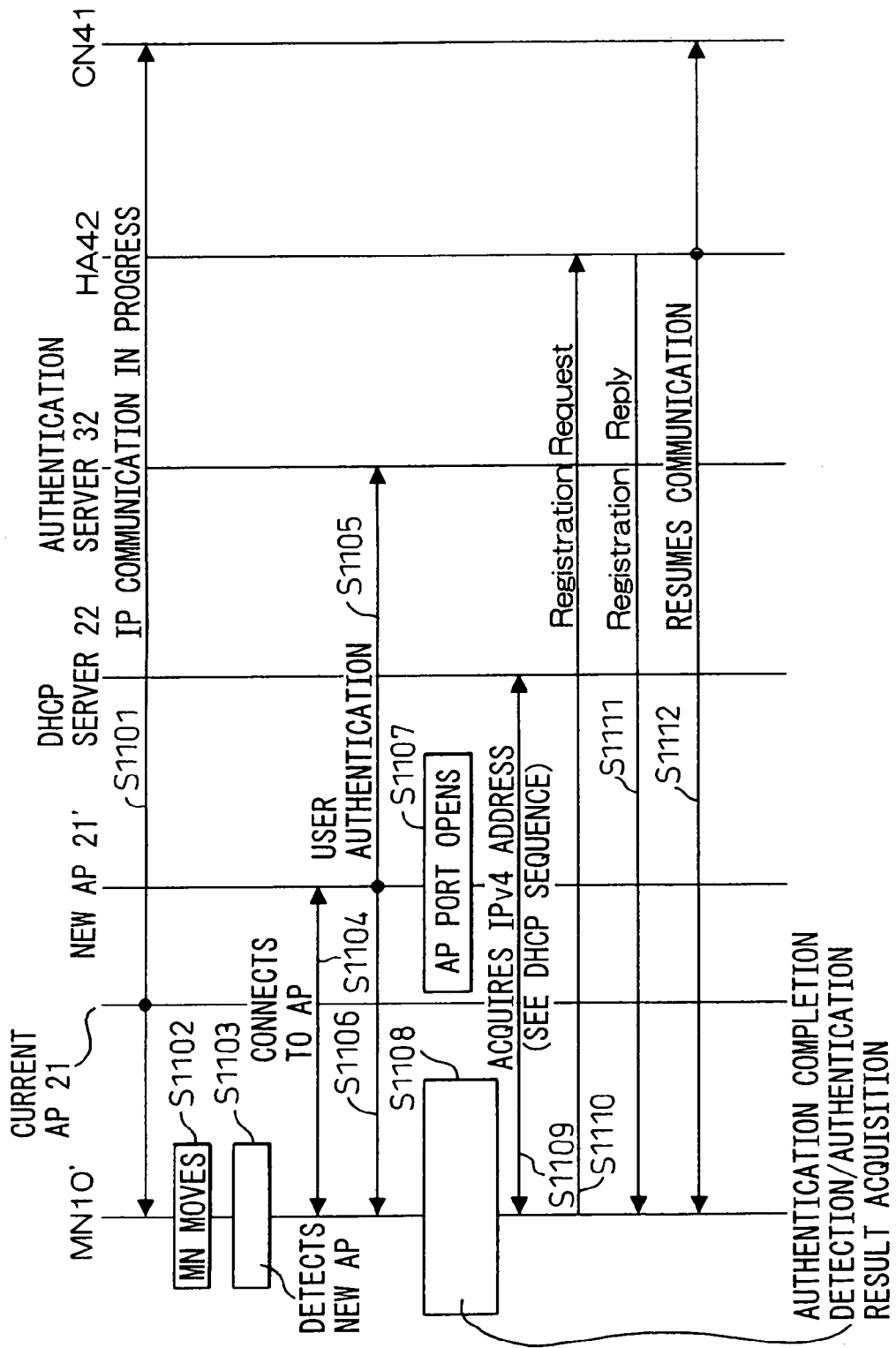
FIG. 23 is a diagram showing one example of a Mobile IPv4 handover sequence in the wireless LAN environment in accordance with the present invention.

FIG. 22 is a diagram showing one example of an IPv4 connection sequence in the wireless LAN environment in accordance with the present invention. FIG. 23 is a diagram showing one example of a Mobile IPv4 handover sequence in the wireless LAN environment in accordance with the present invention.

Operations in FIGS. 22 and 23 can be easily understood from the description so far given. The sequences unique to IPv4 include the authentication completion detection/authentication result acquiring process (S1006) and IPv4 address acquiring sequence (S1007) in FIG. 22. Similarly, they include the authentication completion detection/authentication result acquiring process (S1108) and IPv4 address acquiring sequence (S1109) in FIG. 23. These processes and sequences have already been explained in the description given above.

In Mobile IPv4 handover also, the processing performed by the high-speed IP connection processing section 15 of the present invention is not limited to the DHCP process described in the above embodiment. In cases where a new IP address (CoA) has already been acquired by the time of the authentication completion, a Registration Request message may be transmitted to the home agent 42, instead of the DHCPDISCOVER message.

If there is a foreign agent (FA) in the area where the mobile node 10' is currently located, the Registration_Request message may be transmitted to the foreign agent. Further, when CoA is already acquired, and when hierarchical mobility management is employed that is proposed in the Internet Draft "Mobile IPv4 Regional Registration, a Regional_Registration_Request message may be transmitted as part of the IP connection processing to a gateway foreign agent which manages mobility in the local area.

Next, a description will be given of several embodiments in which the IP connection processing according to the present invention is adapted so that it can also be applied to the processing of encrypted authentication.

Figure 24:
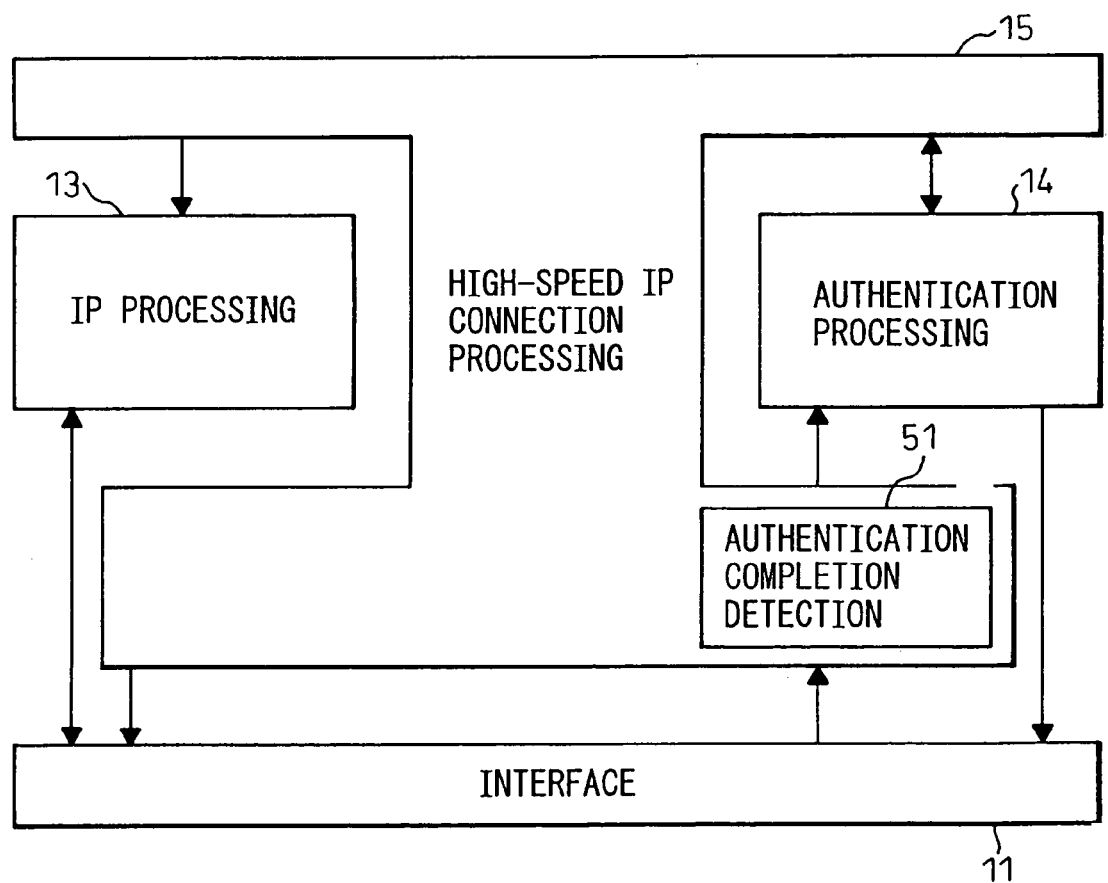
FIG. 24 is a diagram showing a second basic configuration of an IP connection processing device according to the present invention.
Figure 25:
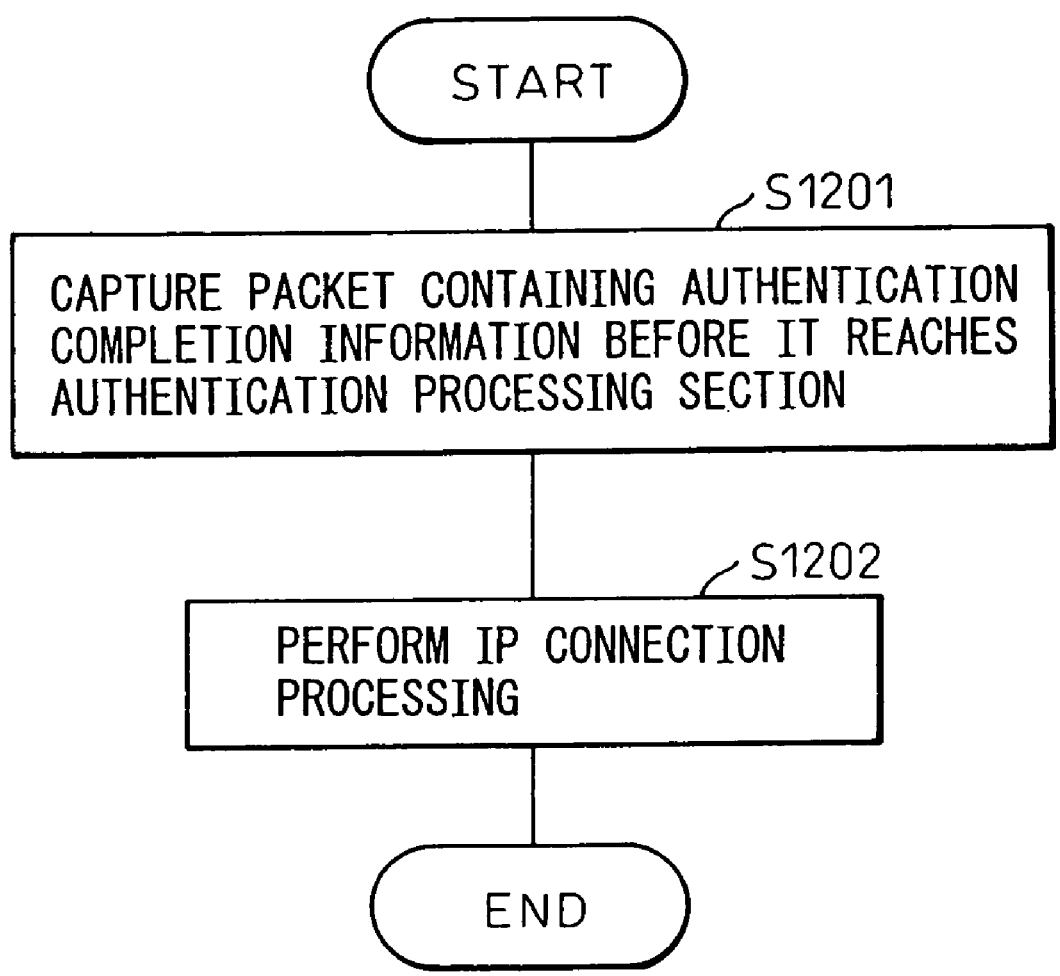
FIG. 25 is a diagram showing one example of a process flow in an authentication completion detection function according to the present invention, or more specifically, a process flow for detecting a packet containing authentication completion information.

FIG. 24 is a diagram showing a second basic configuration of an IP connection processing device according to the present invention. FIG. 25 is a diagram showing one example of a process flow in an authentication completion detection function 51 according to the present invention.

Figure 36:
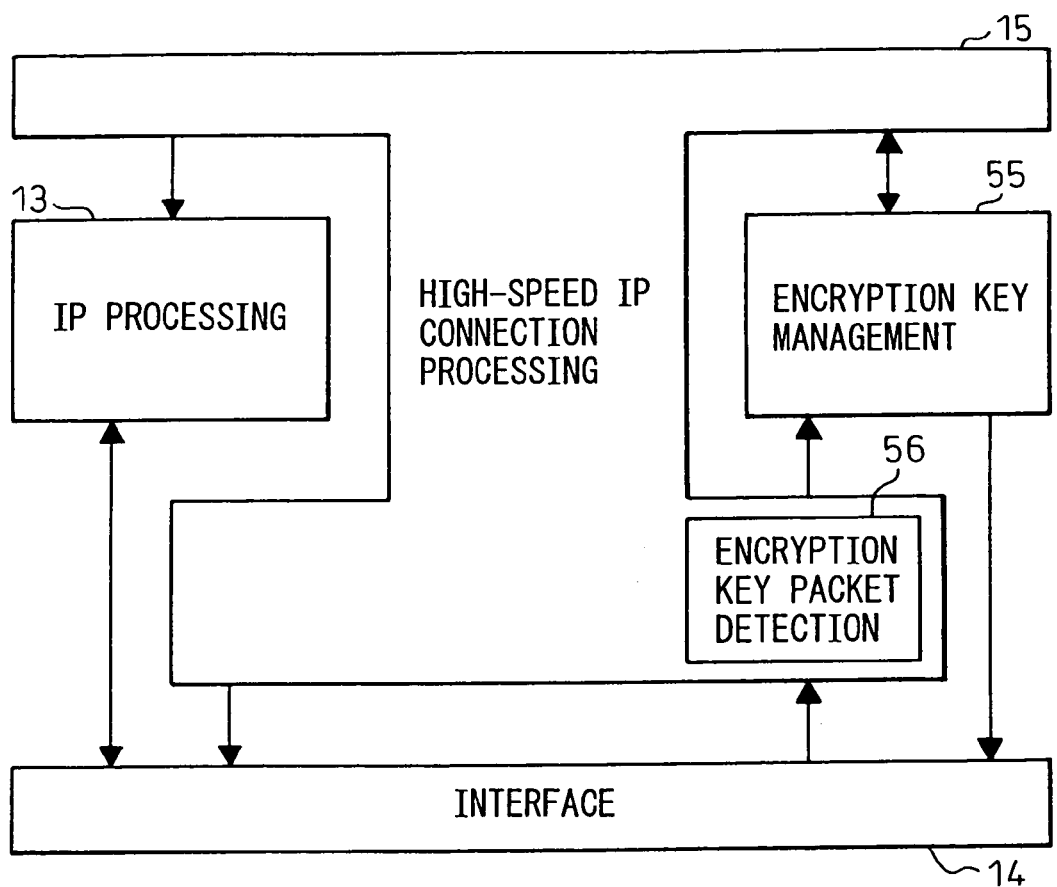
FIG. 36 is a diagram showing a specific example for encryption in FIG. 24.

FIG. 36 shows a specific configuration example specifically designed for encryption. An encryption key management section 55, which manages encryption keys, and an encryption key packet detecting section 56, which detects a packet containing an encryption key, respectively correspond to the authentication processing section 14 and the authentication completion detection function 51 in FIG. 24.

In FIG. 24, the interface section 11, the authentication processing section 14, the high-speed IP connection processing section 15, and the IP processing section 13 are the same as those shown in the first basic configuration of FIG. 7. The example illustrated here differs by the inclusion of the authentication completion detection function 51.

When a packet containing authentication completion information is detected (S1201), the authentication completion detection function 51 notifies the high-speed IP connection processing section 15, irrespective of the authentication result (success or failure), to immediately initiate the IP connection processing (S1202). On the other hand, the authentication processing section 14, concurrently with the IP connection processing, identifies the authentication result (success or failure) from the detected packet containing the authentication completion information, and performs the corresponding processing described below.

Figure 26:
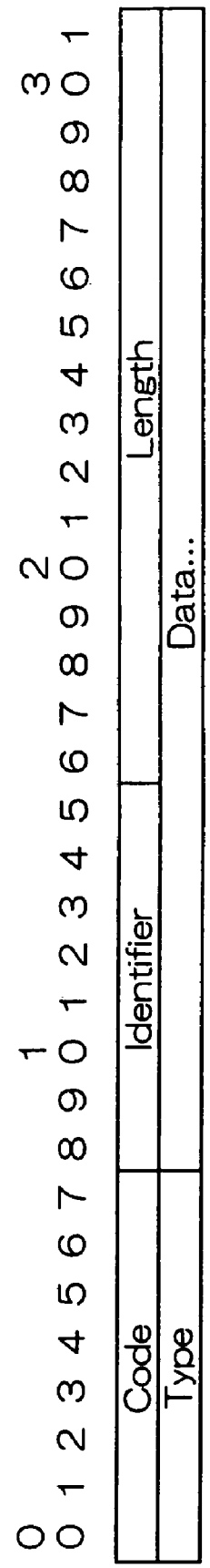
FIG. 26 is a diagram showing one example of a packet containing PEAP-TLS authentication completion information.

FIG. 26 shows one example of the packet containing the authentication completion information indicating the completion of PEAP-TLS authentication. The packet containing the PEAP-TLS authentication completion information is detected by checking that the type field of the EAP-Request message is set to "33", and the result of the authentication is obtained by deciphering the encrypted data "Success" or "Failure" contained in the data field.

Figure 27:
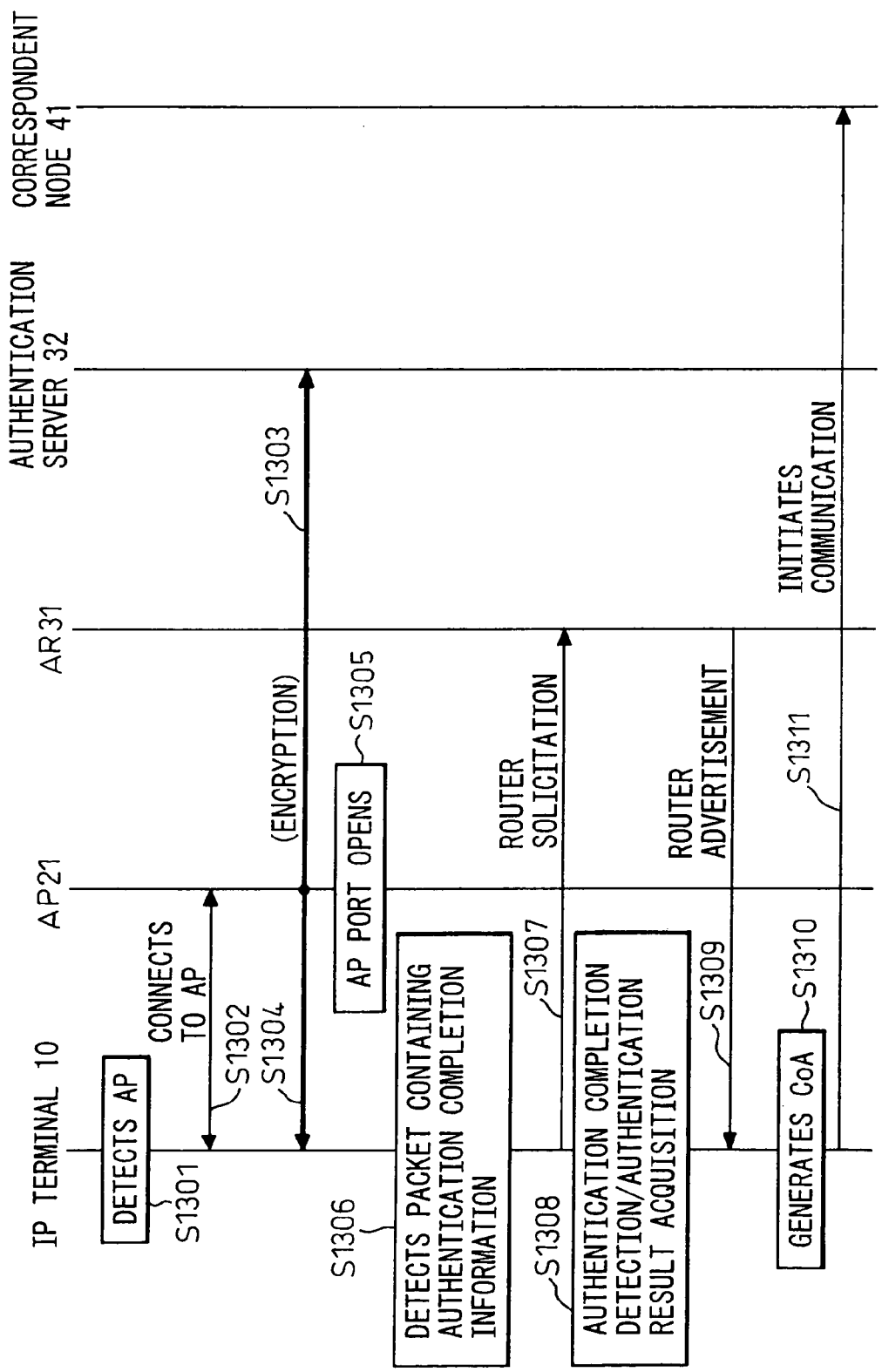
FIG. 27 is a diagram showing one example of an IPv6 connection sequence when the user authentication in FIG. 24 is done successfully.
Figure 28:
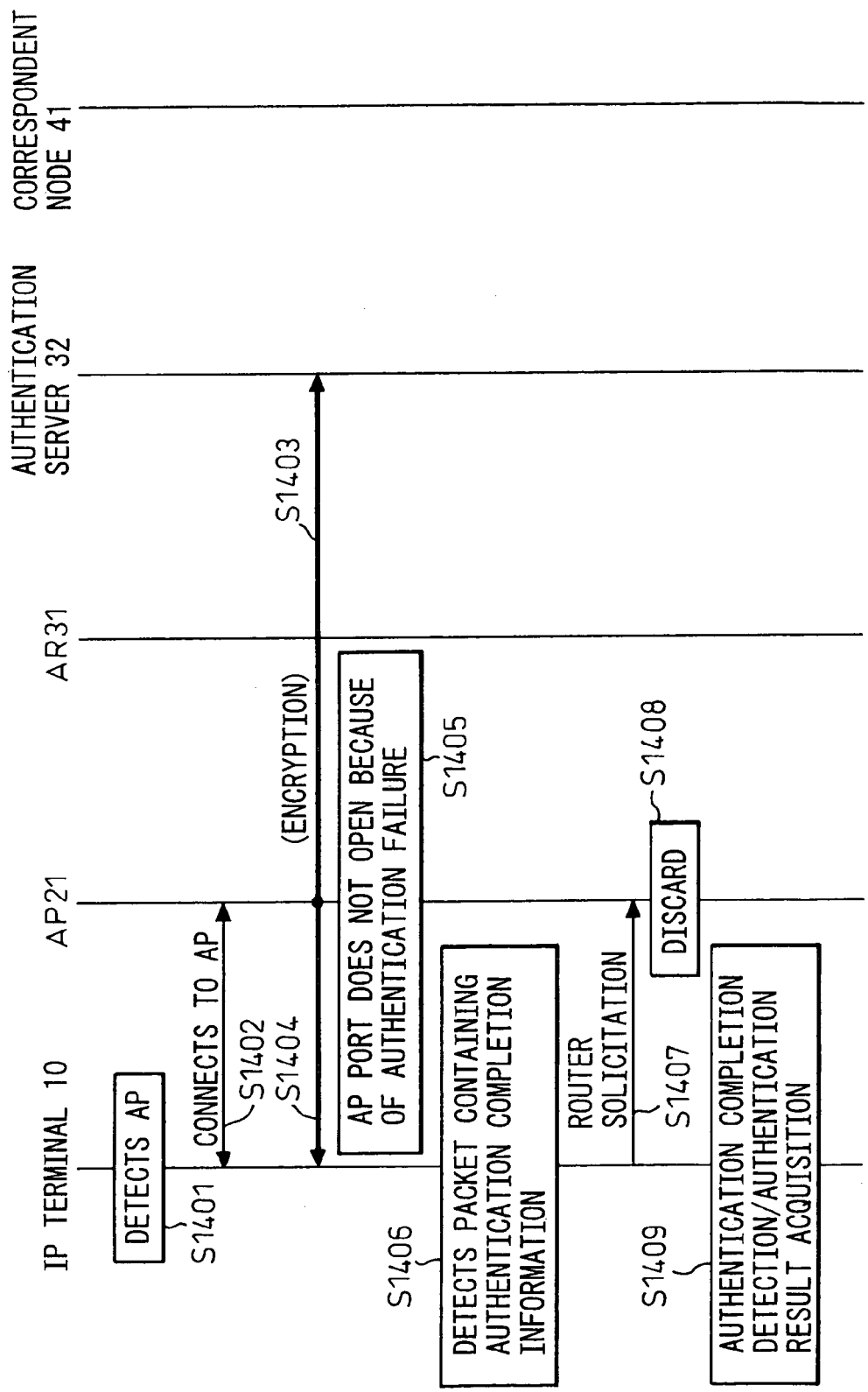
FIG. 28 is a diagram showing one example of an IPv6 connection sequence when the user authentication in FIG. 24 has failed.

FIG. 27 is a diagram showing one example of an IPv6 connection sequence when the user authentication is done successfully. On the other hand, FIG. 28 shows one example of an IPv6 connection sequence when the user authentication has failed. The following description deals only with the differences from the IPv6 connection sequence based on the first basic configuration of the present invention shown in FIG. 15.

In the case of successful user authentication shown in FIG. 27, when the known PEAP-TLS authentication processing indicated by a thick solid arrow is completed, the packet containing the authentication completion information (EAP-Request message carrying the type field "33") is transmitted from the access point 21 to the IP terminal 10 (S1303 and 1304). Further, in response to the successful user authentication, the access point 21 opens its port (S1305).

In the IP terminal 10, when the detecting section 51 for detecting the packet containing the authentication completion information detects the type field "33" carried in the EAP-Request message (S1306), the IP processing section 13 or the high-speed IP connection processing section 15 immediately creates a router request packet and transmits it (S1307). At the same time, the authentication processing section 14 initiates processing to decipher the encrypted data in order to acquire the authentication result (S1308).

Upon receiving the router solicitation packet passed through the access point 21, the access router 31 transmits a router advertisement message to the IP terminal 10 (S1309). Thereafter, the authentication processing section 14 confirms "AUTHENTICATION SUCCESSFUL" and generates CoA (S1310), and initiates IP communication with the correspondent node 41 (S1311). In this example, the IP connection processing is immediately initiated as described above, irrespective of the time required to acquire the authentication result.

On the other hand, in the case of user authentication failure shown in FIG. 28, even when the known PEAP-TLS authentication processing indicated by the thick solid arrow is completed (S1403 and 1404), the port on the access point 21 remains closed because of the user authentication failure (S1405). The IP terminal 10, upon detecting the type field "33" carried in the EAP-Request message, transmits the router solicitation packet in accordance with the same process as that shown in FIG. 27 (S1406 and 1407). However, the router solicitation packet is not accepted by the access point 21 and is discarded (S1408).

In the meantime, the authentication processing section 14 of the IP terminal 10 confirms "AUTHENTICATION FAILED" (S1409), and either terminates the user authentication process or retries the user authentication. It can therefore be seen that if the IP terminal 10 transmits the router solicitation packet upon detecting the packet containing the authentication completion notification without confirming the authentication result (success or failure), no particular trouble is caused to the operation on the network side. On the other hand, in the case of the successful authentication shown in FIG. 27, the IP connection processing is immediately initiated.

Figure 29:
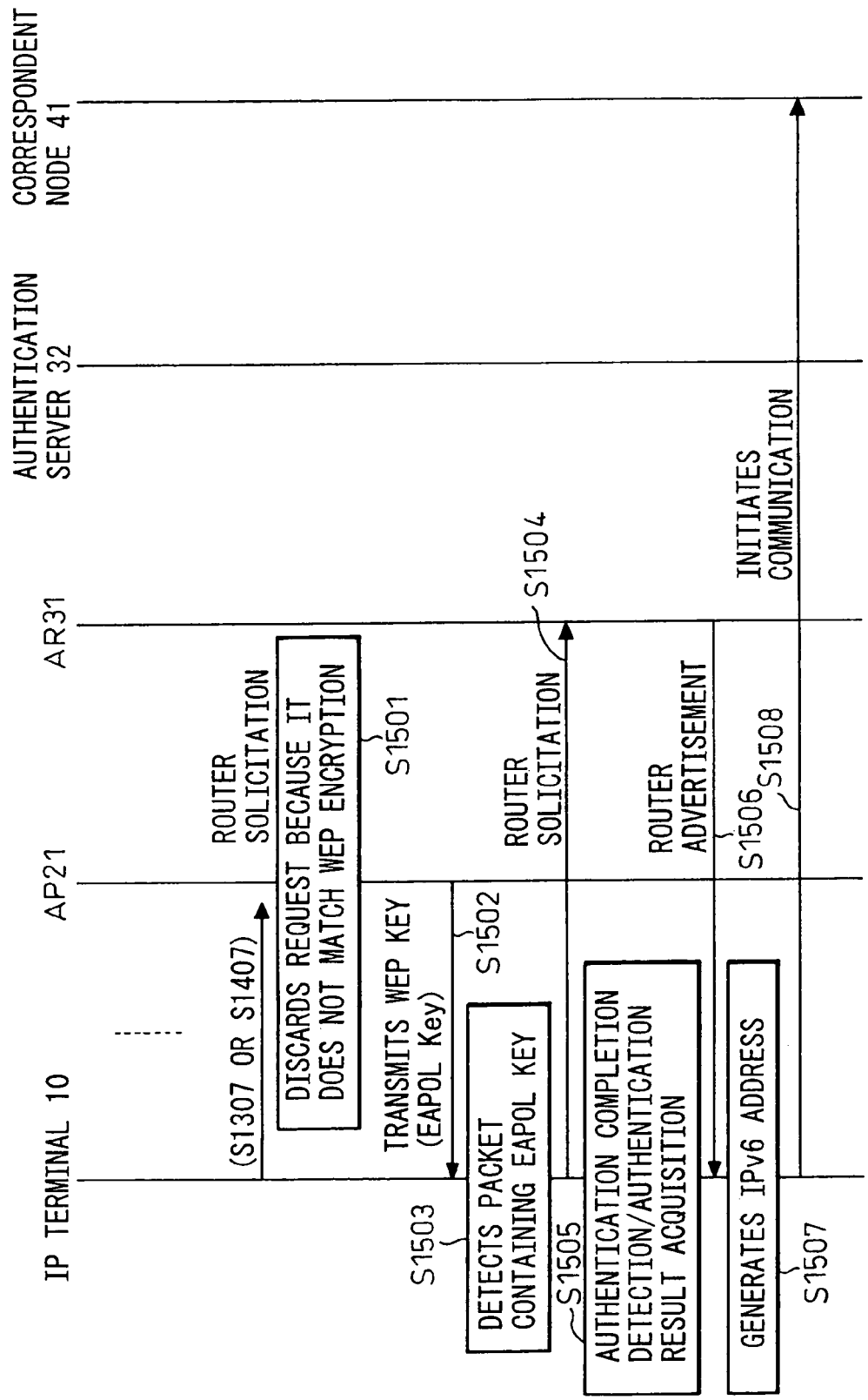
FIG. 29 is a diagram showing one example of the IPv6 connection sequence involving WEP encryption in FIG. 24.
Figure 30:
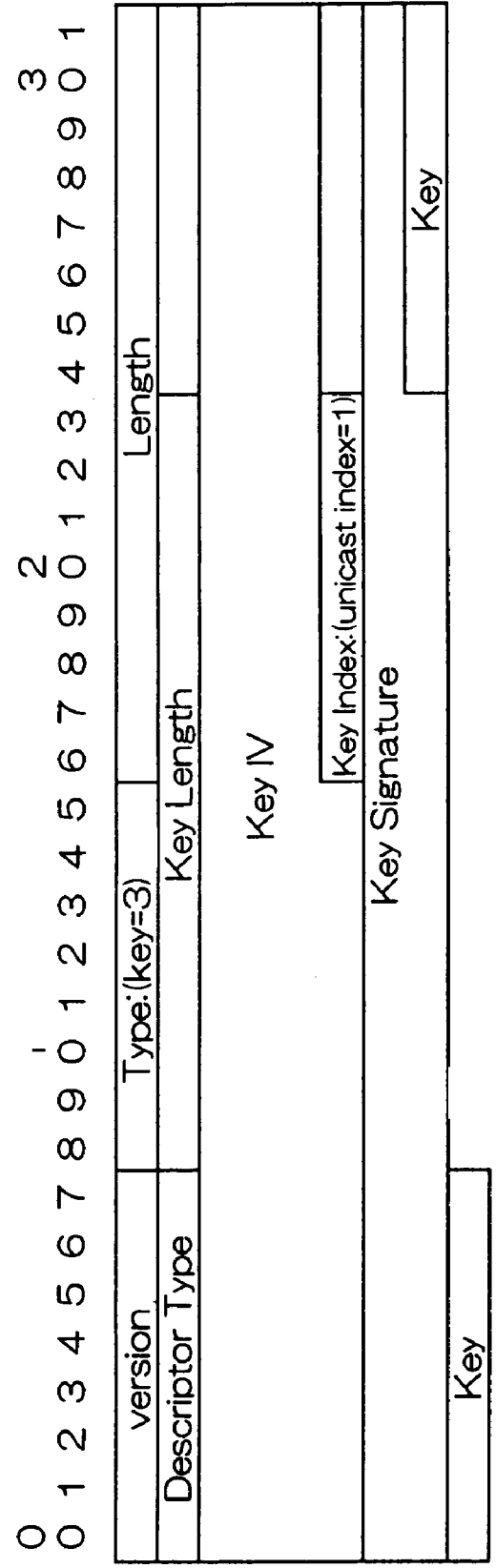
FIG. 30 is a diagram showing one example of a packet containing an EAPOL key.

As one mode of the sequences of FIGS. 27 and 28 described above, a description will be given below for the case where WEP (Wired Equivalent Privacy) encryption is performed between the IP terminal 10 and the access point 21. FIG. 29 shows one example of the IPv6 connection sequence involving WEP encryption, and FIG. 30 shows one example of a packet containing an EAPOL key. Here, FIG. 29 only shows the sequence that follows the router solicitation in FIG. 27 or 28 (S1307 or S1407).

Since the IP terminal 10 transmits the router solicitation by only detecting the packet containing the authentication completion information (S1307 or S1407), there can occur cases where it does not match the WEP encryption expected by the access point 21. In such cases, the router solicitation is not accepted by the access point 21 but is discarded, and the port on the access point 21 remains closed (S1501). Thereafter, the access point 21 transmits a WEP key (EAPOL key) to the IP terminal 10 (S1502).

The packet containing the EAPOL key is detected by checking that the type field is set to "3" and that the key index field carries "unicast index=1", as shown in FIG. 30. The EAPOL key is used in the processing of delivering a key when performing WEP encryption between the IP terminal 10 and the access point 21; in encryption on a wireless channel, this information can provide the timing for opening the port of the access point 21.

In the illustrated example, the IP terminal 10 transmits the router solicitation upon detecting the packet containing the EAPOL key. Accordingly, the high-speed IP connection processing according to the present invention can be applied even when WEP encryption is employed. In this example, the detecting section 51 for detecting the packet containing the authentication completion information also serves the function of detecting the packet containing the EAPOL key. The process thereafter is the same as that in the earlier described embodiments.

It will be appreciated that the second basic configuration of the present invention can also be applied to each embodiment described in connection with the first basic configuration, for example, to the embodiment using the intermediate driver (see FIG. 18). In the example of FIG. 18, the authentication processing section 14 can be configured to intercept and detect the packet containing the authentication completion information and/or the EAPOL key containing packet passed through the intermediate driver 16. Further, the authentication completion detection function 51 may be provided within the intermediate driver 16.

Next, a description will be given of a configuration adapted to prevent unnecessary traffic from flowing from the terminal of the present invention to the access point.

Figure 31:
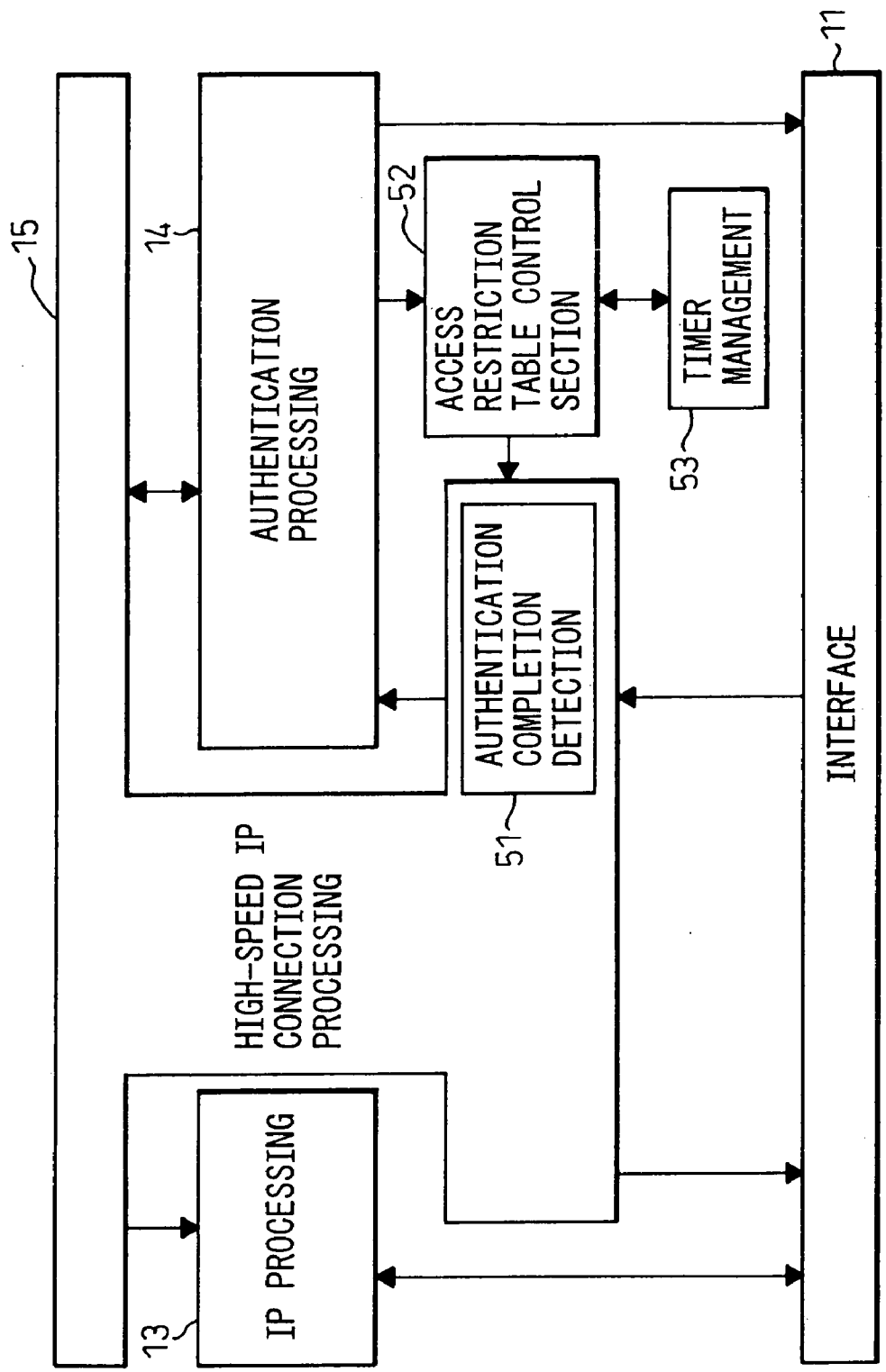
FIG. 31 is a diagram showing a third basic configuration of an IP connection processing device according to the present invention.
Figure 33:
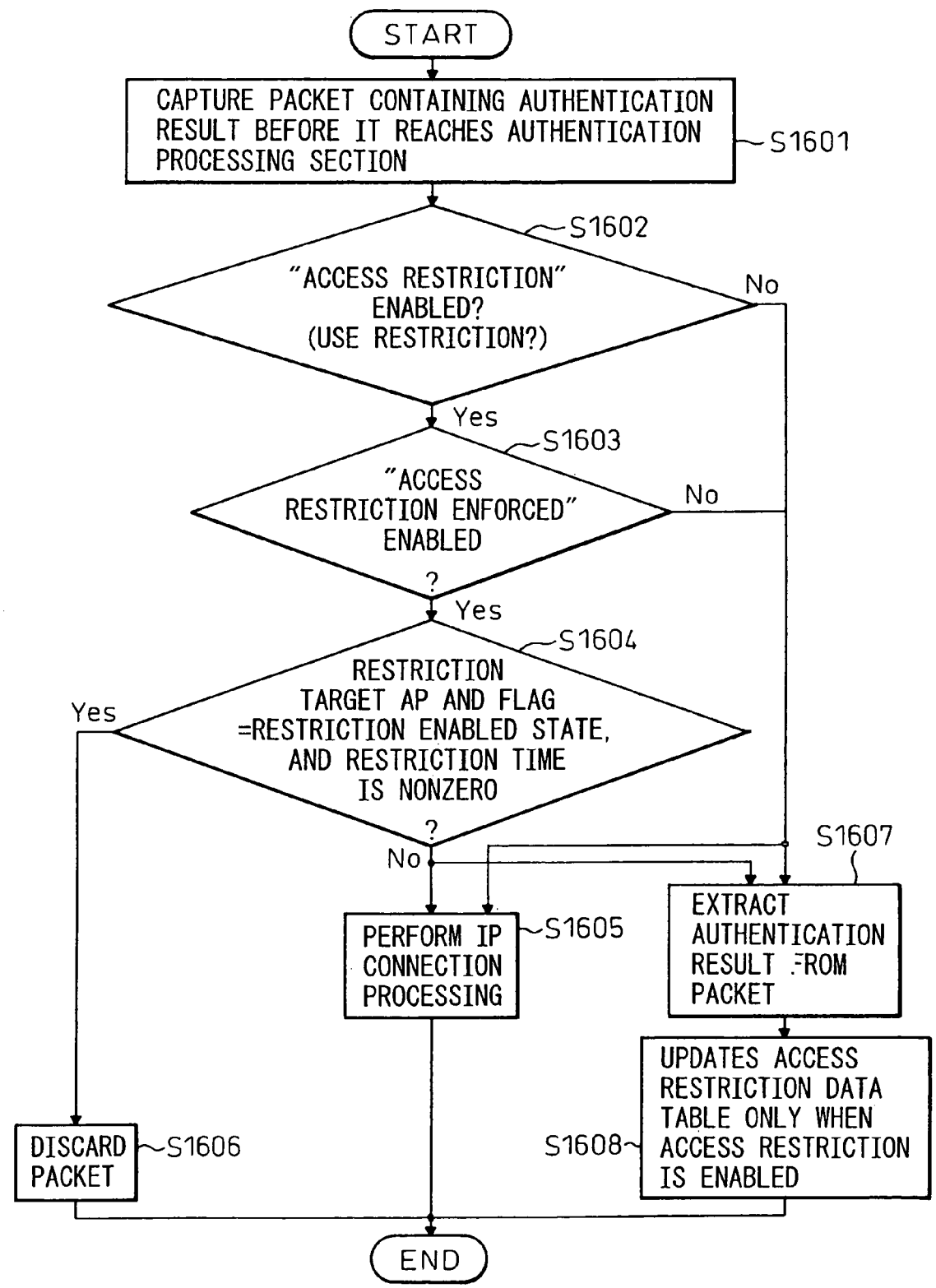
FIG. 33 is a diagram showing an example (1) of an access restriction process flow in FIG. 31.
Figure 34:
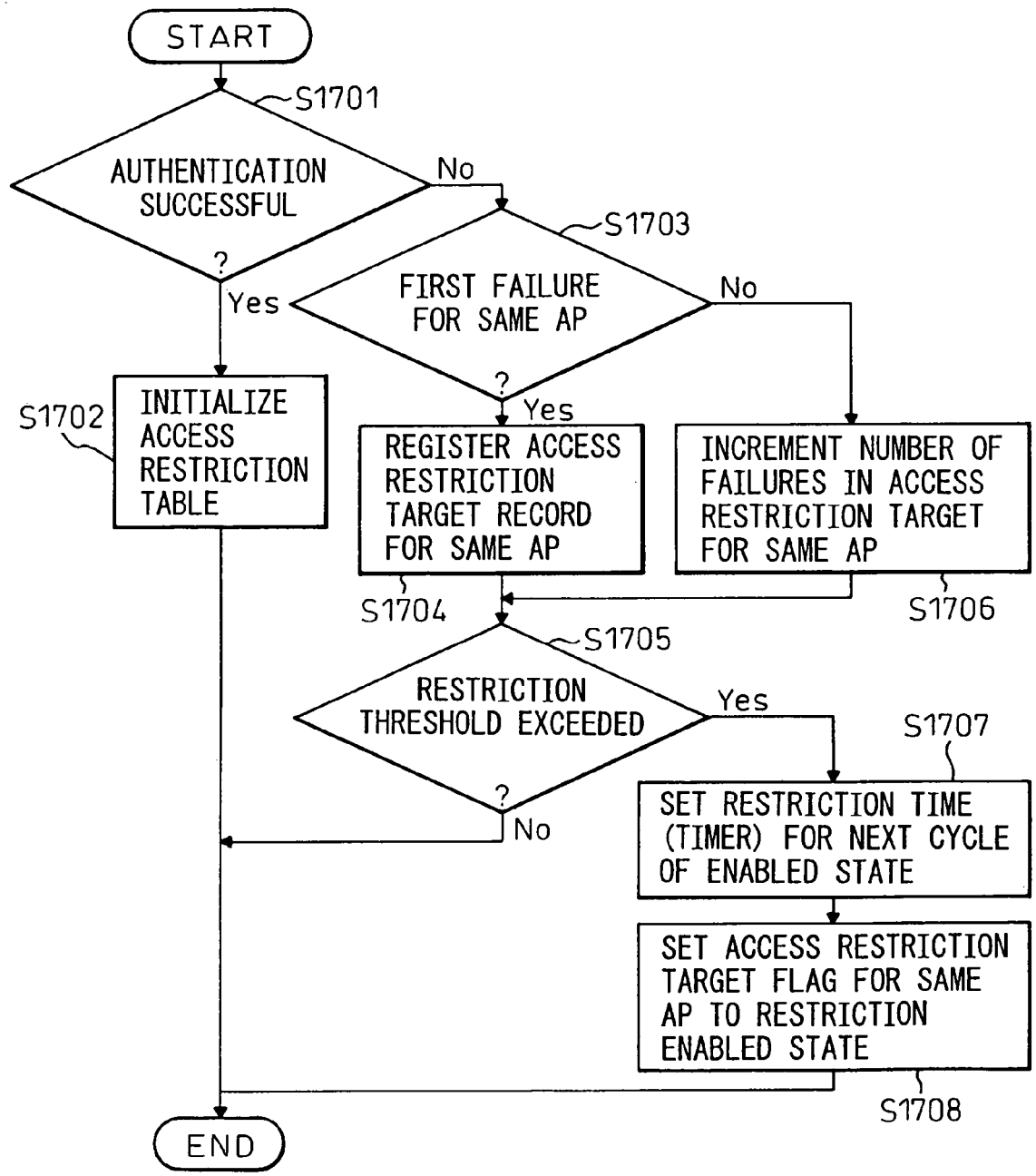
FIG. 34 is a diagram showing an example (2) of an access restriction process flow in FIG. 31.
Figure 35:
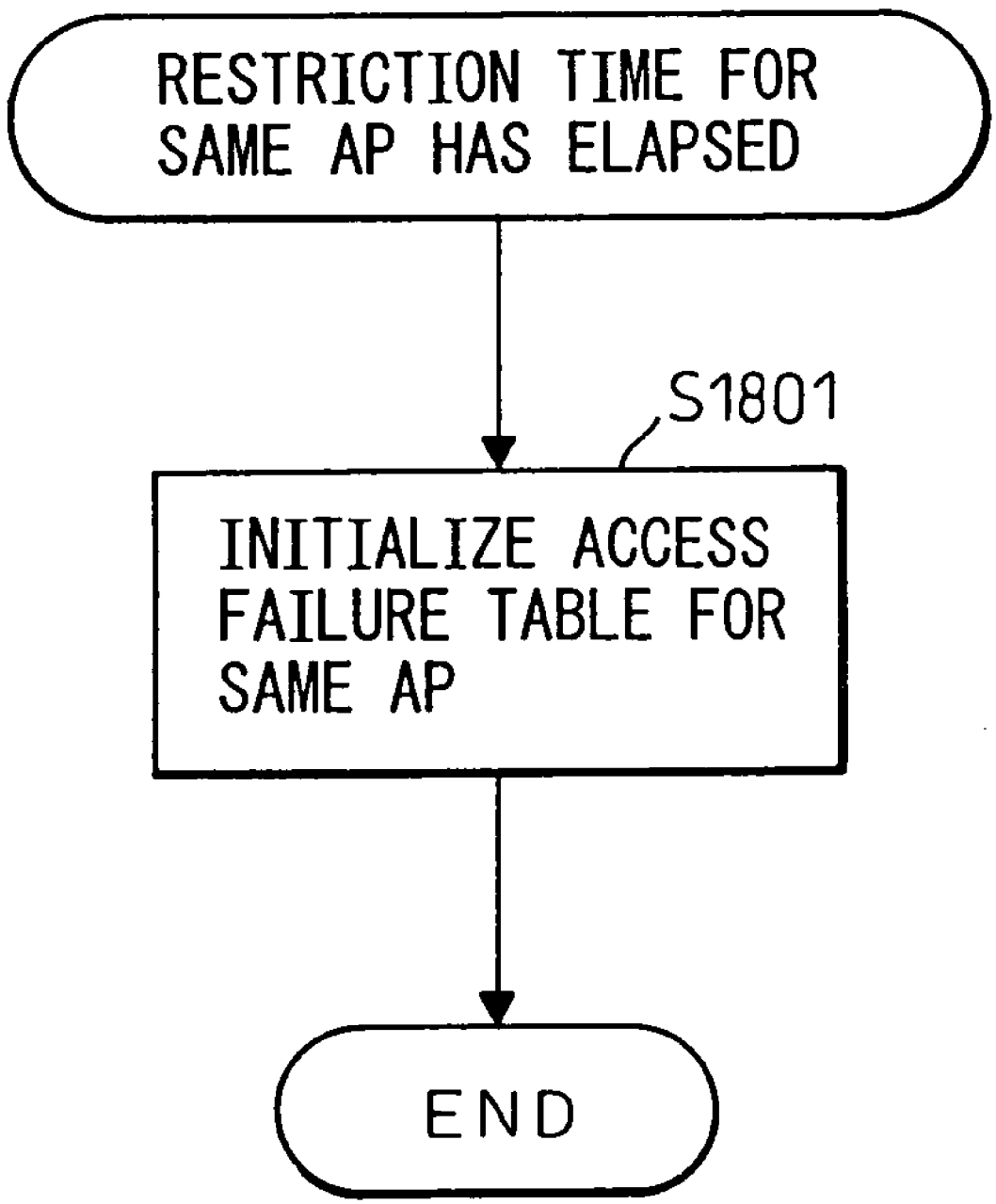
FIG. 35 is a diagram showing an example (3) of an access restriction process flow in FIG. 31.

FIG. 31 is a diagram showing a third basic configuration of an IP connection processing device according to the present invention. FIG. 32 shows one example of an access restriction table used in the present embodiment. FIGS. 33 to 35 are diagrams each showing one example of an access restriction process flow according to the present invention.

In FIG. 31, the interface section 11, the authentication processing section 14, the high-speed IP connection processing section 15, the IP processing section 13, and the authentication completion detection function 51 are the same as those in FIG. 24. The configuration shown here differs by the inclusion of an access restriction table control section 52, which prevents unnecessary traffic from occurring to the access point 21 by repeatedly retrying user authentication at the time of authentication failure, and a timer management section 53, which manages the access restriction time.

The access restriction table control section 52 contains the access restriction table 54 shown in FIG. 32; its "ACCESS RESTRICTION" field is enabled when enforcing the access restriction using the access restriction table, and its "ACCESS RESTRICTION ENFORCED" field is enabled if there is any one access point designated as an access restriction target AP.

One record is generated for each "access restriction target access point", and its "RESTRICTION TARGET AP" field carries information unique to each individual access point, for example, BSSID (Basic Service Set Identifier), etc. Its "FLAG" field is set to "1" when the number of authentication failures at the corresponding access point has exceeded a predetermined threshold and the access restriction is enabled, the "NUMBER OF FAILURES" field carries the number of times the authentication actually failed, the "RESTRICTION THRESHOLD" field carries the number of failures exceeding which the access restriction is enabled, and the "RESTRICTION TIME" field sets the "effective time" remaining within the access restriction time. When this access restriction time has elapsed, the "RESTRICTION TIME", "FLAG", and "NUMBER OF FAILURES" fields are cleared to "0", and the access restriction is thus lifted.

The access restriction process according to the present invention will be described below with reference to FIGS. 33 to 35. This process is performed within, or in relation to, the earlier described authentication result acquiring process (step S761 in FIG. 15, step 1308 in FIG. 27, S1409 in FIG. 28, or S1505 in FIG. 29).

FIG. 33 shows one example of an access restriction judging process. When the authentication result is captured before it reaches the authentication processing section 14, if "ACCESS RESTRICTION" and "ACCESS RESTRICTION ENFORCED" are both enabled, the authentication completion detection function 51 checks "RESTRICTION TARGET AP" based on the access restriction information supplied from the access restriction table control section 52; if it indicates the access restriction enabled state (FLAG is "1" and "RESTRICTION TIME" is "x" (nonzero)), then it is determined that the corresponding access point is in an access restriction enforced state, and the packet containing the authentication completion information is discarded (S1602 to 1604 and S1606). This prevents unnecessary IP connection processing from being initiated.

When the conditions in S1604 are satisfied and the process is caused to branch to S1607, invalid traffic can be prevented by not performing the IP connection processing, and when the authentication is successful, the access restriction can be lifted immediately.

If the above conditions are not satisfied, the authentication completion detection function 51 instructs the high-speed IP connection processing section 15 to perform the IP connection processing (S1605) and, at the same time, passes the packet containing the authentication completion information to the authentication processing section 14 (S1607). Based on the authentication result from the authentication processing section 14, the access restriction table control section 52 updates the access restriction table 54 (S1608).

FIG. 34 shows one example of the access restriction table updating process.

If the authentication result from the authentication processing section 14 shows that the authentication is successful, the access restriction table control section 52 deletes the corresponding "RESTRICTION TARGET ACCESS POINT" and, when there is no remaining "RESTRICTION TARGET ACCESS POINT", then it disables "ACCESS RESTRICTION ENFORCED" (S1701 and 1702). On the other hand, in the case of an authentication failure, it is determined whether it is the first failure or not (S1703) and, if it is the first failure, the "RESTRICTION TARGET ACCESS POINT" record for the corresponding access point is newly generated and registered (S1704). Otherwise, "NUMBER OF FAILURES" is incremented (S1706). Next, if the number of failures exceeds "RESTRICTION THRESHOLD", then "RESTRICTION TIME" and "FLAG" are set accordingly, to place the corresponding access point in the access restriction enabled state (S1705, 1707, and 1708).

When the access restriction is enabled in FIG. 34, the restriction target access point (BSSID) may be reported to the operating system or application program or the like so that the access point will not be selected from the higher level.

FIG. 35 shows one example of the timer process performed in the timer management section 53; here, when the "RESTRICTION TIME" of the restriction target access point has elapsed, the access restriction table control section 52 is notified accordingly, whereupon the access restriction table control section 52 deletes the corresponding "RESTRICTION TARGET ACCESS POINT" and, when there is no remaining "RESTRICTION TARGET ACCESS POINT", then disables "ACCESS RESTRICTION ENFORCED" (S1801). According to the present invention, as unnecessary IP connection processing and reconnection processing are inhibited after the restriction is enforced, the amount of traffic to the access point 21 to which a plurality of IP terminals access is reduced, thus achieving faster IP connection processing in the network as a whole.

As described above, according to the first basic configuration of the present invention, faster IP connection processing is achieved without causing unnecessary IP connection processing. According to the second basic configuration of the present invention, faster IP connection processing is achieved irrespective of delays due to encryption/decryption processing, etc. Further, according to the third basic configuration of the present invention, unwanted traffic at the access point is reduced, and faster IP connection processing is achieved in the network as a whole.

In this way, by adding high-speed IP connection processing section for operating the authentication processing section and the IP processing section of the OS in a cooperative manner, the connection time required to initiate IP communication can be shortened. Furthermore, when the present invention is applied to access point switching in a wireless LAN environment, high-speed handover can be achieved.

The invention claimed is:

1. An IP terminal that performs communications based on reception of periodically broadcasted router advertisement messages transmitted from a router, the IP terminal comprising:

an IP connection processing device that comprises:
  a part to detect authentication completion for connection to an IP network that requires user authentication for connection to the IP network via an access point and the router;
  a part to transmit a request for a router advertisement message to be transmitted separately from the periodically broadcasted router advertisement messages upon detection of the authentication completion;
  a part to receive the router advertisement message transmitted from the router in response to the request; and
  a part to initiate or resume communications based on the received router advertisement message even if the periodically broadcasted router advertisement message has not been received.

2. An IP terminal that performs communications based on reception of periodically broadcasted router advertisement messages transmitted from a router, the IP terminal comprising:
  an IP connection processing device that comprises:
    a part to detect authentication completion for connection to an IP network that requires user authentication for connection to the network via an access point and the router;
    a part to acquire an authentication result;
    a part to transmit a request for a router advertisement message to be transmitted separately from the periodically broadcasted router advertisement messages upon successful completion of the authentication;
    a part to receive the router advertisement message transmitted from the router in response to the request; and
    a part to initiate and to resume communications based on the received router advertisement message even if the periodically broadcasted router advertisement message has not been received.

3. The IP terminal as in claim 1 or 2, wherein the IP connection processing device comprises:
  an IP processing section which performs the IP connection processing;
  an authentication processing section which performs authentication processing; and
  a high-speed IP connection processing section which requests the authentication processing section to detect authentication completion and which, upon detection of the authentication completion, issues an instruction to the IP processing section to initiate or resume the IP connection processing.

4. The IP terminal as in claim 3 wherein, instead of requesting the authentication processing section to detect authentication completion, the high-speed IP connection processing section detects the authentication completion by intercepting input information on the way to the authentication processing section and, upon detection of the authentication completion, issues an instruction to the IP processing section to initiate or resume the IP connection processing.

5. The IP terminal as in claim 4, wherein the high-speed IP connection processing section includes a device driver which performs the interception, or another driver which performs the interception between the device driver and an operating system containing the authentication processing section.

6. The IP terminal as in claim 3, wherein for processing performed with an operating system containing the authentication processing section and the IP processing section, the high-speed IP connection processing section utilizes an API of the operating system.

7. The IP terminal as in claim 3, wherein the IP processing section, in response to the instruction, requests IP address information from the IP network, and acquires an IP address of its own based on the information returned by the IP network.

8. The IP terminal as in claim 3, wherein the high-speed IP connection processing section, upon detection of the authentication completion, makes a request to the IP network to acquire IP address information, instead of issuing an instruction to the IP processing section to initiate or resume the IP connection processing, and
  the IP processing section acquires an IP address of its own from the information returned by the IP network.

9. The IP terminal as in claim 1, further comprising:
  means for detecting a failure of user authentication; and
  means for inhibiting the IP connection processing after detecting the authentication failure.

10. The IP terminal as in claim 9, wherein the means for inhibiting the IP connection processing includes an access restriction table for managing access enable/disable for each access port.

11. An IP terminal that performs communications based on reception of periodically broadcasted router advertisement messages transmitted from a router, the IP terminal comprising:
  an IP connection processing device that comprises:
    a part to detect a packet containing an encryption key used for communication with an access point that is connected to the router for connection to an IP network that requires user authentication for connection to the IP network;
    a part to transmit a request for a router advertisement message to be transmitted separately from the periodically broadcasted router advertisement messages upon detection of the packet containing the encryption key;
    a part to receive the router advertisement message transmitted from the router in response to the request; and
    a part to initiate and to resume communications based on the received router advertisement message even if the periodically broadcasted router advertisement message has not been received.

12. The IP terminal as in claim 11, wherein the IP connection processing device comprises:
  an IP processing section which performs the IP connection processing;
  an encryption key management section which manages the encryption key; and
  a high-speed IP connection processing section which intercepts input information on the way to the encryption key management section and which, upon detection of the encryption key, issues an instruction to the IP processing section to initiate or resume the IP connection processing.

13. The IP terminal as in claim 12, wherein the high-speed IP connection processing section includes a device driver which performs the interception, or another driver which performs the interception between the device driver and an operating system containing the encryption management section.

14. The IP terminal as in claim 12 wherein, for processing performed with an operating system containing the encryption key management section and the IP processing section, the high-speed IP connection processing section utilizes an API of the operating system.

15. The IP terminal as in claim 12, wherein the IP processing section, in response to the instruction, requests IP address information from the IP network, and acquires an IP address of its own based on the information returned by the IP network.

16. The IP terminal as in claim 12, wherein the high-speed IP connection processing section, upon detection of the encryption key, makes an request to the IP network to acquire IP address information, instead of issuing an instruction to the IP processing section to initiate or resume the IP connection processing, and the IP processing section acquires an IP address of its own from the information returned by the IP network.

17. The IP terminal as in claim 1, 2 or 11, wherein the IP connection processing is initiated when connecting to an access network, and is resumed when moving into a different access network.

* * * * *